Figure 7:
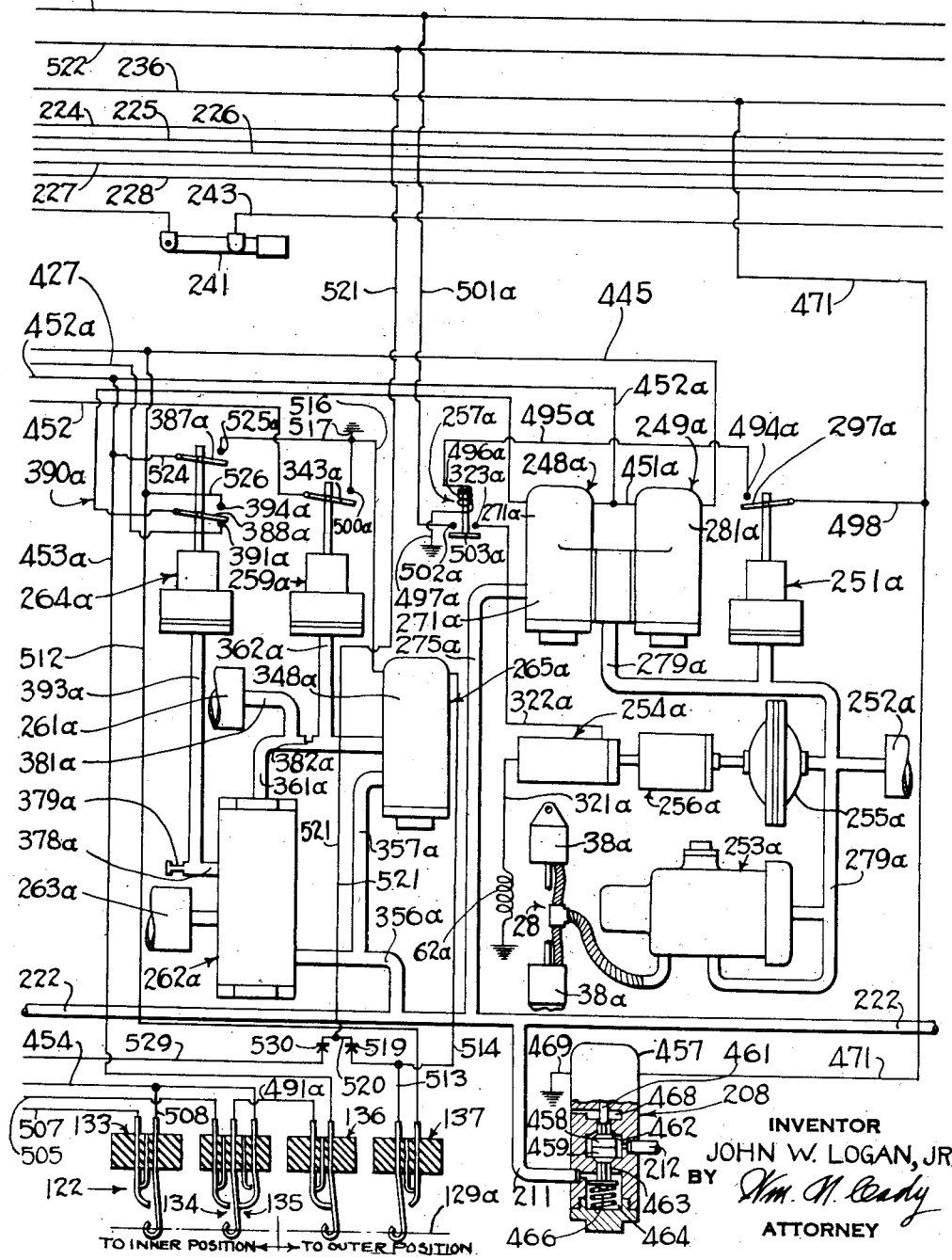

Oct. 19, 1937.  J. W. LOGAN, JR  2,096,433
RAILWAY VEHICLE BRAKE EQUIPMENT
Filed Nov. 23, 1935    5 Sheets-Sheet 1
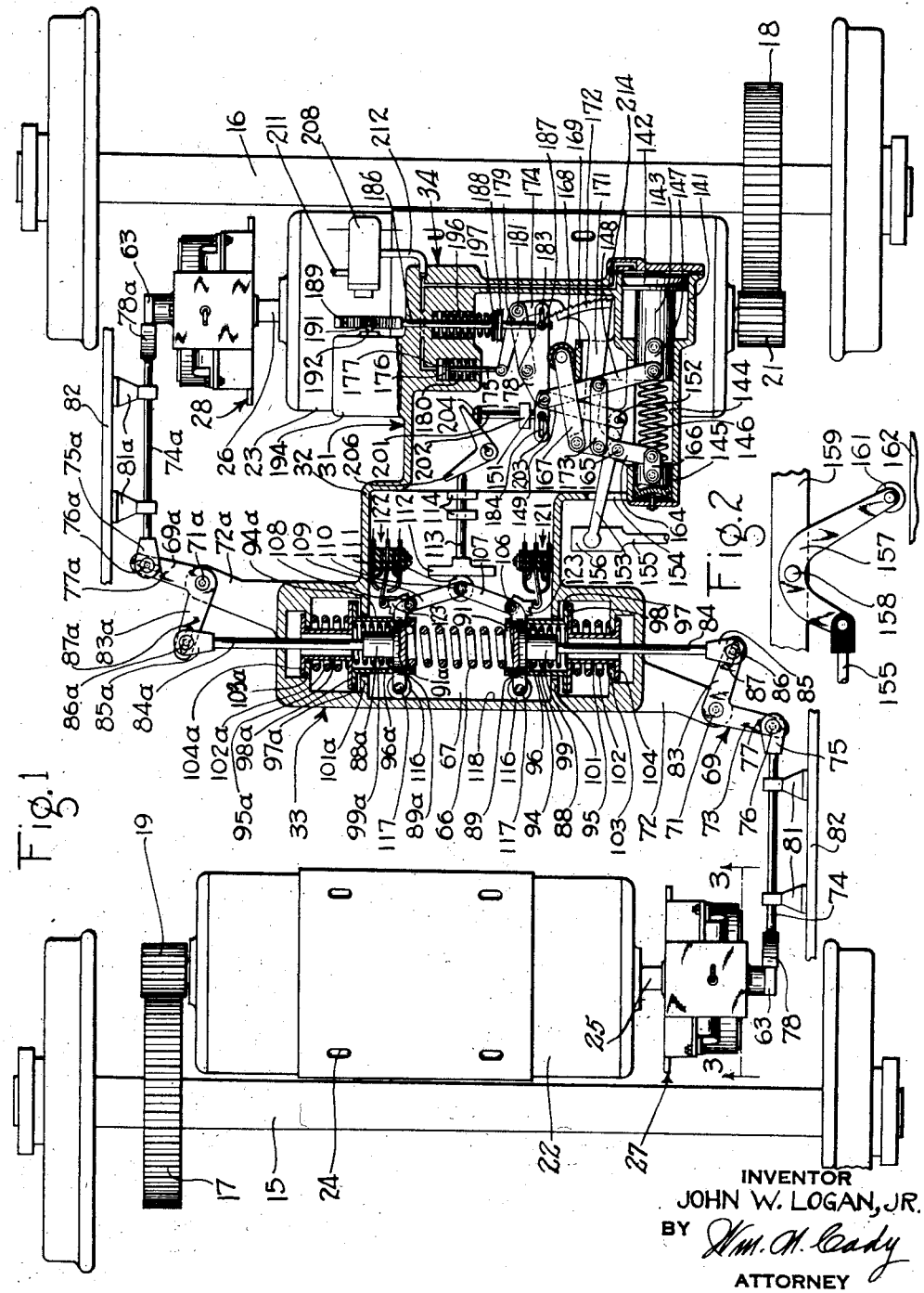
INVENTOR
JOHN W. LOGAN, JR.
BY
*Wm. H. Cady*
ATTORNEY Oct. 19, 1937.  J. W. LOGAN, JR  2,096,433
RAILWAY VEHICLE BRAKE EQUIPMENT
Filed Nov. 23, 1935   5 Sheets-Sheet 2
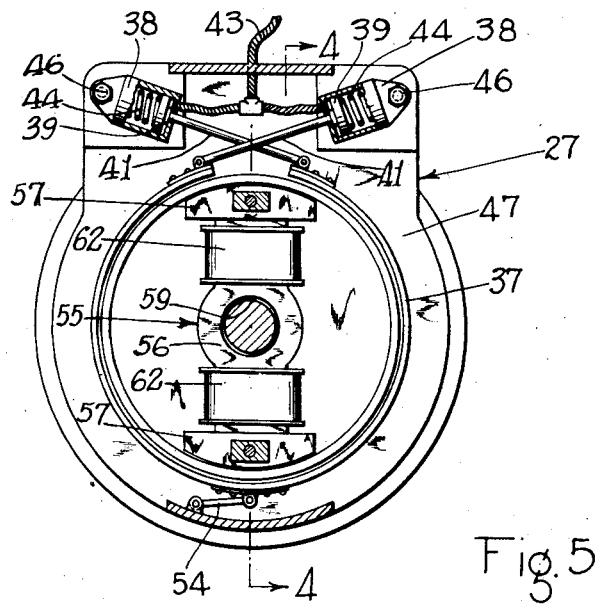
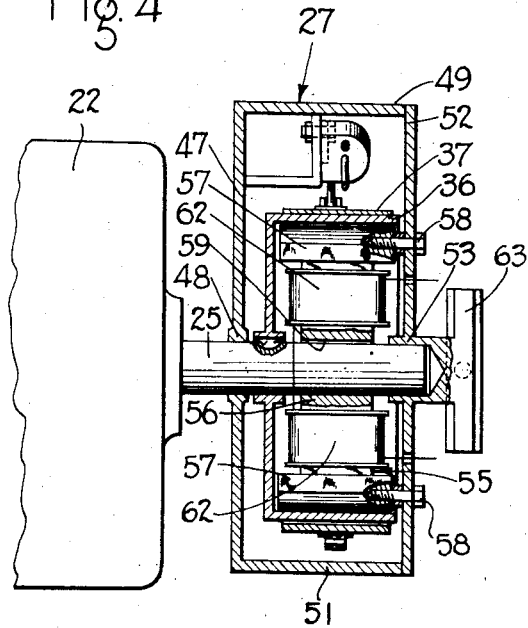
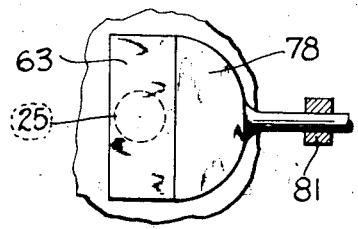
INVENTOR
JOHN W. LOGAN, JR.
BY Wm. M. Cady
ATTORNEY

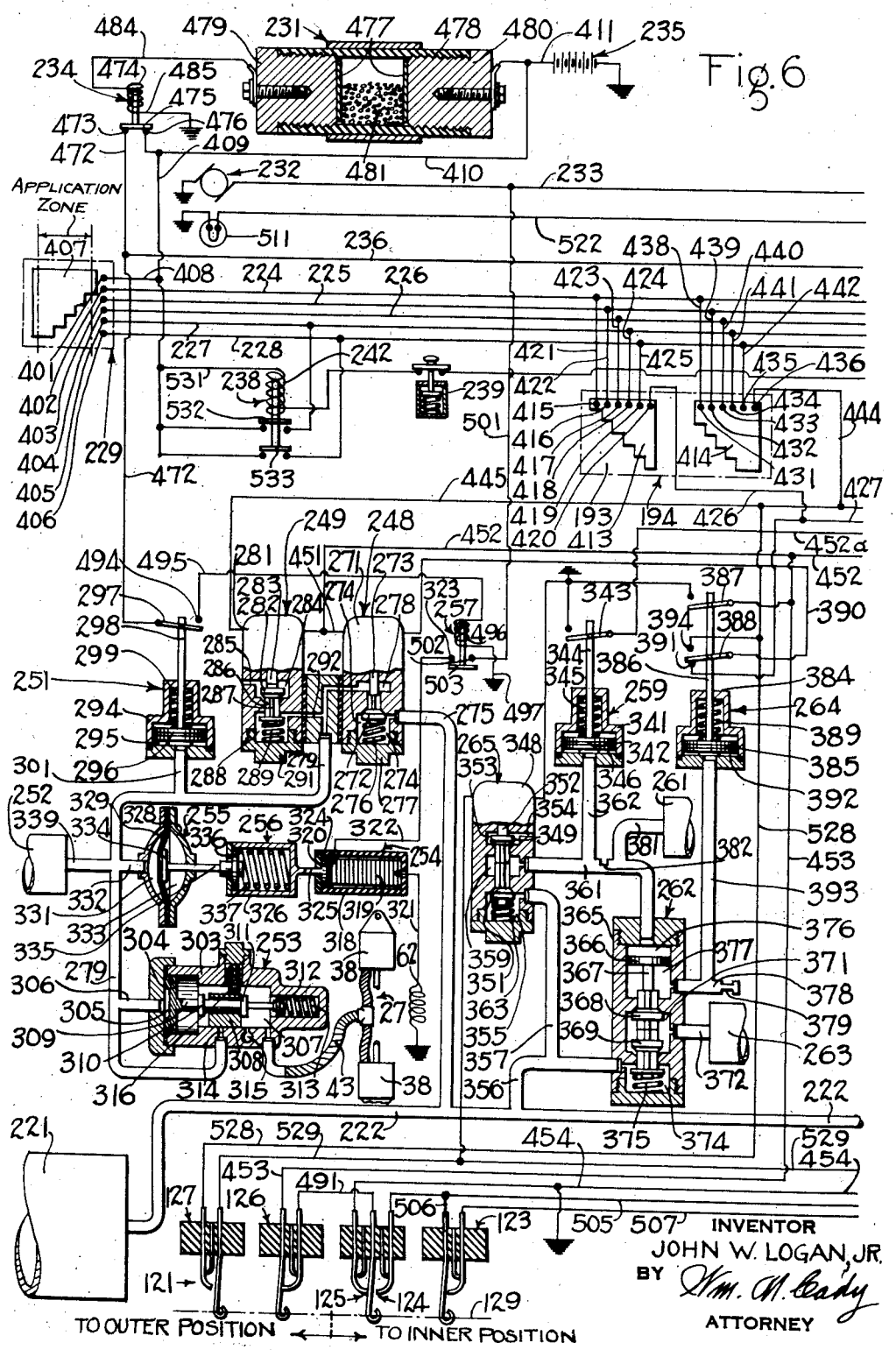

Oct. 19, 1937.  J. W. LOGAN, JR  2,096,433
RAILWAY VEHICLE BRAKE EQUIPMENT
Filed Nov. 23, 1935   5 Sheets-Sheet 4

INVENTOR
JOHN W. LOGAN, JR.
BY Wm. N. Cady
ATTORNEY

Oct. 19, 1937.  J. W. LOGAN, JR  2,096,433
RAILWAY VEHICLE BRAKE EQUIPMENT
Filed Nov. 23, 1935  5 Sheets-Sheet 5
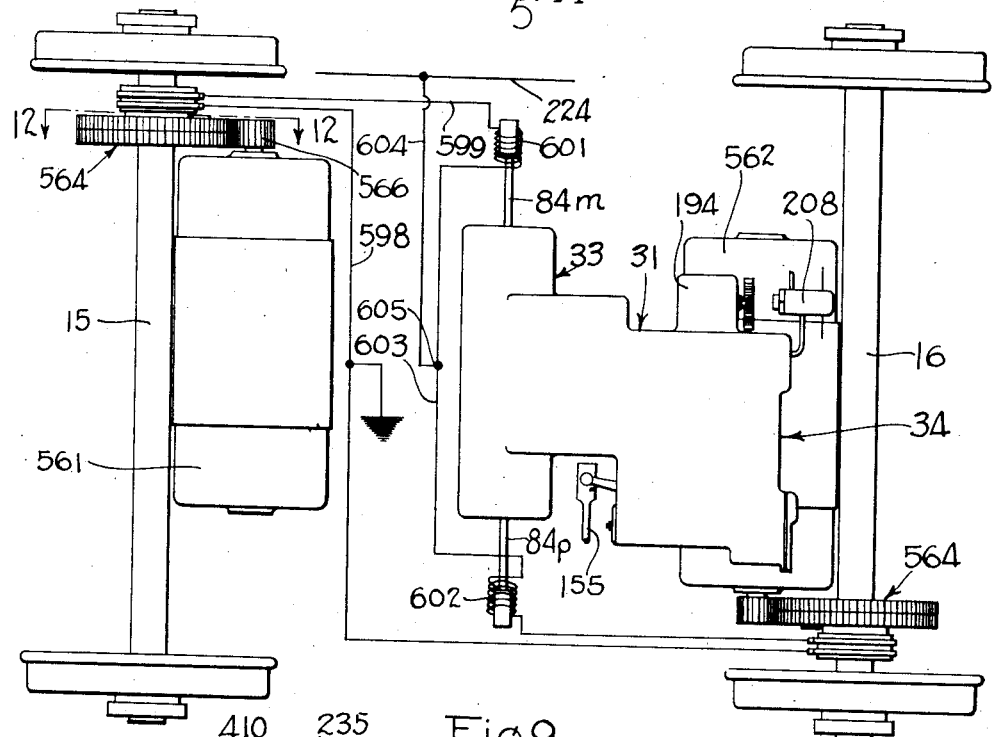
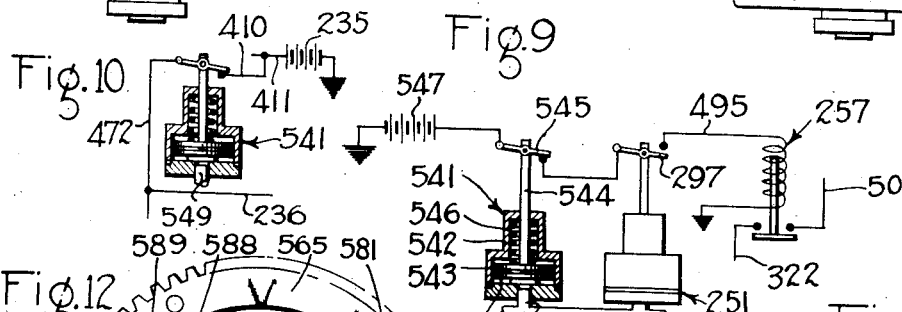
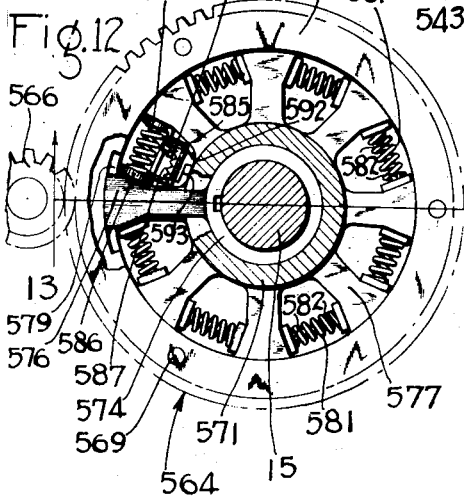
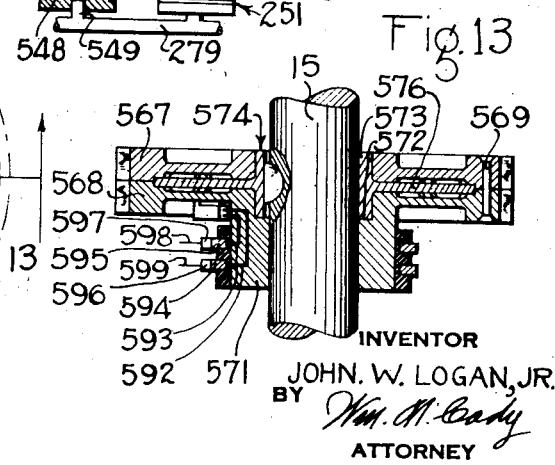
INVENTOR
JOHN. W. LOGAN, JR.
BY Wm. M. Cady
ATTORNEY Patented Oct. 19, 1937

2,096,433

UNITED STATES PATENT OFFICE 2,096,433

RAILWAY VEHICLE BRAKE EQUIPMENT

John W. Logan, Jr., Forest Hills, Pa., assignor to The Westinghouse Air Brake Company, Wilmerding, Pa., a corporation of Pennsylvania Application November 23, 1935, Serial No. 51,218

58 Claims. (Cl. 303—15)

This invention relates to brake controlling systems for vehicles, such as railway trains, and has particular relation to brake controlling systems adapted to prevent the wheels on the vehicle or train from sliding.

As is well known, sliding of the wheels of the train causes flat spots to be developed on the wheels which necessitates repair or replacement of the wheels. With the advent of high speed trains and the correspondingly higher braking forces required to maintain stopping distances of the same order as now exist in the case of trains traveling at a lower speed, it has become increasingly important to guard against sliding of the wheels of the train.

As is well understood by those skilled in the art, sliding of the wheels of a train upon application of the brakes is due to the fact that the retarding force acting to impede rotation of the wheels overcomes the adhesion between the wheels and the rails. Adhesion between a wheel and the rail along which it rolls may be expressed in terms of a coefficient of adhesion which is the ratio of the maximum tangential retarding force that can be effective on a wheel without causing it to slide, relative to the weight supported by and pressing the wheel to the rail, the coefficient usually being expressed as per cent of the weight pressing the wheel to the rail.

It is well known that when a wheel is sliding along the rails the frictional contact between the wheel and the rail produces a braking effect on the wheel which is considerably less than the braking effect produced when the wheel is permitted to continue rolling along the rail while subject to a force of retardation just insufficient to cause the wheel to slide. It follows therefore from the fact that the maximum braking effect or rate of retardation of a wheel is that which results from the imposition of a maximum retarding force which will not cause the wheels to slide, that the degree of braking effect produced on a wheel will be in proportion to the ratio which the actual retarding force imposed on a wheel bears to the maximum retarding force capable of being imposed on a wheel without causing it to slide.

Since the maximum retarding force capable of being imposed on a wheel without causing it to slide represents the maximum degree in terms of retarding force to which the adhesion between the wheel and the rail may be utilized, the percentage or degree of the actual retarding force acting on a wheel relative to the maximum retarding force which may be imposed on a wheel without causing it to slide is hereinafter referred to as the degree of adhesion utilization.

It follows therefore, that if the degree of adhesion utilization is maintained less than the maximum degree to which the adhesion may be utilized, that a wheel will not slide.

In the case of a train of cars, it is not sufficient however merely to maintain the degree of adhesion utilization less than the maximum degree possible, it being essential that the degree of braking effect produced on all the wheels of all cars of a train be uniform. Uniformity of braking effect on all wheels of a train of cars can be produced or effected by causing the retarding force effective tangentially on each wheel to bear a substantially uniform ratio to or be a uniform percentage of the maximum tangential retarding force which may be imposed on the wheel, that is, by producing a uniform degree of adhesion utilization at each wheel.

Since under actual operating conditions, the weight of different cars and the passenger or freight load carried by the different cars varies, the various wheel-trucks on the same or different cars of a train bear or support different loads, and it follows that if uniform retarding forces are produced on all wheels of all wheel-trucks, a uniform braking effect, that is rate of retardation of all cars, will not be produced. As a result the cars will run toward each other or pull out away from each other depending upon whether a car in advance has the greater or lesser braking effect produced thereon respectively. By producing a substantially uniform braking effect on all cars of a train it will be apparent that there will be relatively little tendency for the cars to run in or pull out and that the shock to the cars as well as discomfort to the passengers incident to the running in and pulling out of the cars will be obviated.

Unless the braking on all wheels is such as to produce a uniform degree of adhesion utilization at each wheel, not only will there be uncomfortable shocks as coupler slack adjusts to allow the more effectively braked cars to restrain the cars less effectively braked, but also it follows that as the braking effect is increased at a uniform percentage, those wheels most effectively braked with respect to the loads they carry will be the ones which will have the greatest tendency to slide. A considerable disparity in the braking effectiveness as between different wheels on the same train naturally reduces the maximum retardation obtainable on the train without wheel slipping.

My invention accordingly includes means for measuring the actual braking effect produced on the wheels of each individual wheel-truck, and means for each wheel-truck which is conditioned according to the load or weight carried by the individual wheel-truck, whereby the degree of retarding force produced by the brake devices on each wheel-truck is so controlled that a substantially uniform degree of adhesion utilization is effective on all wheel-trucks and a correspondingly uniform degree of braking effect produced on all cars of the train.

The coefficient of adhesion between the wheels and the rails is different depending upon whether the wheels and the rails are dry, wet, oily, frosty or sanded. The condition of the wheels and the rails being uncertain, it is difficult to provide a brake controlling system which will prevent wheels on a train from sliding under all conditions. My invention, therefore, includes means which is operative automatically upon the occurrence of small or minor differences in the braking effect produced on the different wheels of a wheel-truck while they still continue to roll, for so controlling the brakes associated with the different wheels as to tend to restore the uniformity of the braking effect produced on the different wheels. My invention, furthermore, includes means which is operative automatically upon the occurrence of major differences in the braking effect produced on the different wheels of the same wheel-truck, as where one wheel starts to slide and another wheel continues to roll, for releasing the brakes on the wheels which start to slide while at the same time maintaining the application of the brakes associated with the wheels which continue to roll without increasing such application.

In general, it is an object of my invention to so control the brakes on a vehicle or train of cars that a substantially uniform degree of braking effect is produced on each wheel at any given instant, thus minimizing likelihood of sliding the wheels.

More specifically it is an object of my invention to provide means local to each individual wheel-truck on a train of cars, which means is automatically conditioned to control the degree of adhesion utilization on all wheels of the individual wheel-trucks in accordance with the load carried by or supported on the corresponding wheel-truck so as to produce a substantially uniform degree of braking effect on all cars of the train.

Another object is to provide a brake control means of the character indicated in the foregoing object and including means local to each individual wheel-truck and responsive to the torque force exerted on the brake devices associated with the wheel-truck for measuring the actual braking effect produced on the wheels of each wheel-truck, whereby variations in the coefficient of brake shoe friction caused by variations in the braking force applying the brake shoes or by changes in the speed of rotation of the wheels may be automatically compensated for and a uniform degree of braking effect produced.

Another object is to provide a brake control system having means manually operative to select a uniform desired degree of adhesion utilization or degree of braking effect for all wheels, and means local to each wheel-truck functioning automatically to control the brakes on each of the wheel-trucks individually in accordance with the load on the wheel-truck and in accordance with the degree of braking effect produced on the wheels of the wheel-truck, to limit the maximum degree of braking effect on any of the wheels of the wheel-truck to that degree selected and to regulate the braking effect on all wheels to the degree selected.

A further object of my invention is to provide means of the character indicated in the foregoing object, and including means operative in accordance with the greatest braking effect on any of the different pairs of wheels of an individual wheel-truck for controlling the brakes on all the wheels of the individual truck, to limit the maximum degree of braking effect on any of the pairs of truck wheels to that degree selected.

A yet further object of my invention is to provide means of the character indicated in the two foregoing objects, including means responsive to small or minor differences in the degree of braking effect on the different wheels of a wheel-truck for so controlling the braking means associated with the different wheels of the truck as to tend to equalize the degree of braking effect on the different wheels.

A still further object of my invention is to provide means of the character indicated in the foregoing object, and including means responsive to large or major differences in the degree of braking effect on the different wheels of each individual wheel-truck, such as occurs when one wheel slides and another continues to roll, for so controlling braking means associated with the different wheels on the truck as to automatically relieve the braking means associated with the sliding wheel for a predetermined time and then to cause the braking means to be re-applied for a predetermined time.

An additional object is to provide electrical braking means, such as an eddy current brake, in which the braking effect caused thereby reduces as the speed of the train reduces, and means for measuring the braking effect on a wheel or wheel axle produced by the electrical braking means and operative automatically to control the electrical braking means so that it tends to maintain a substantially constant or uniform braking effect.

A yet additional object is to provide a braking system of the character indicated in the foregoing object and including a fluid pressure operated braking means of the friction type associated with each wheel with which an electrical braking means is associated and which is automatically controlled by the braking effect measuring means to supplement, that is compensate for, a decrease in the braking effect inherently produced by the electrical braking means, or in the event that the electrical braking means fails entirely.

A still further object is to provide a brake control system of the character indicated in the foregoing object and including novel means whereby the braking effect on a vehicle wheel or wheel axle may be measured or determined.

The above objects and other objects, which will be made apparent hereinafter, are attained by means of illustrative embodiments of my invention, which will be subsequently described and which are shown in the accompanying drawings, wherein Fig. 1 is a diagrammatic plan view of a two-axle wheel-truck, showing one embodiment of means for measuring the braking effect on the wheels of the truck and also the disposition and arrangement of means for registering the load on the wheel trucks, the parts being shown in the position occupied thereby when the brakes are released, Fig. 2 is a diagrammatic view, illustrating an operating mechanism for the load responsive device shown in Fig. 1, Fig. 3 is an enlarged sectional view taken on line 3—3 of Fig. 1, showing the details of construction and the arrangement of an eddy current brake and a friction type fluid pressure operated brake associated with the armature shaft of each one of the driving motors shown in Fig. 1, Fig. 4 is a sectional view, partly in section, taken on line 4—4 of Fig. 3, showing in further detail the construction and disposition of parts of the brake device shown in Fig. 3, Fig. 5 is a fragmentary view looking toward the right end of Fig. 4, showing the details of construction of the parts whereby mechanical connection between the supporting casing for the braking means and the means for measuring the braking effect shown in Fig. 1, is established, Figs. 6 and 7, taken together, constitute a diagrammatic view showing the electrical control circuits and other equipment comprising my invention as conditioned when the train of cars is running along the road with brakes released.

Fig. 8 is a chart indicating the condition of the individual switches making up the group switches shown in Figs. 6 and 7 for the various operating positions thereof, Figs. 9 and 10 are fragmentary views showing two different modifications in part of the system shown in Figs. 6 and 7.

Fig. 11 is a diagrammatic plan view of a two-axle wheel-truck showing a modified arrangement including electrical circuits whereby means for measuring the braking effect on a wheel axle is controlled and operated electrically, Fig. 12 is a view taken on line 12—12 of Fig. 11, showing the details of the flexible gear or quill type gear drive and the arrangement and disposition of control mechanism in relation to the gear drive, Fig. 13 is a sectional view taken on line 13—13 of Fig. 12, showing in further detail the arrangement of and circuit connections to the control mechanism shown in Fig. 11.

Referring to Fig. 1 of the drawings, my invention is illustratively shown in connection with a wheel-truck having a pair of axles 15 and 16 and gear wheels 17 and 18 respectively fixed thereto and adapted to be driven through the pinion gears 19 and 21 respectively, by the driving motors 22 and 23 respectively. For simplicity the truck frame is not shown, but it is to be understood that a truck frame of suitable character is provided. The motors 22 and 23 are fixedly mounted on the truck frame as by suitable bolts (not shown) extending through the holes 24 in the bed-plate of the motors. The axles 15 and 16 are suitably cradled on the truck frame to rock about the longitudinal axis of the armature shaft 25 of the associated motors so as to maintain a constant driving connection between the gear wheels 17 and 18 and the pinion gears 19 and 21, respectively, upon movement of the axle relative to the truck frame. The purpose of fixedly mounting the motors on the truck frame instead of movably mounting the motors on the truck frame, as is frequently the case, is to enable the mechanical association with the motors of parts to be hereinafter described.

Associated with the armature shaft 25 of the motors 22 and 23 are brake devices 27 and 28 respectively, which are constructed and arranged as hereinafter described.

Suitably mounted on and fixed to the truck frame is an operating mechanism 31 having a casing 32 embodying in one portion thereof a device 33 for measuring the braking effect on the axles 15 and 16 individually and jointly and in another portion a device 34 for measuring the load on the wheel-truck and which is similar in some respects to the variable load device described in Patent No. 1,670,391, to T. H. Thomas.

The brake devices 27 and 28 are similar, in some respects, to the brake device shown and described in my Patent No. 2,014,903, assigned to the assignee of this application. Since the brake devices 27 and 28 are identical in construction and operation, it is deemed sufficient to describe only the brake device 27.

Referring to Figs. 1, 3 and 4, the brake device 27 comprises a brake drum 36 secured to the end of the armature shaft 25 of the motor 22 and, cooperating with the external surface of the drum 36, a brake band 37 actuated into frictional engagement with the brake drum 36 by means of a pair of pressure cylinders 38. Each of the pressure cylinders 38 comprises a piston 39 having a piston rod 41, the external end of the two rods 41 being connected, respectively, to opposite ends of the brake band 37. Fluid under pressure is supplied to one side of each of the pistons 39 through a supply conduit or pipe 43 to actuate the piston to cause contraction of the band 37 around the outer surface of the brake drum 36. Upon release of fluid under pressure through the conduit 43, a spring 44 at the opposite side of each of the pistons acts to return the pistons and effect release of the band 37 from the drum 36. It should be understood that, if desired, other types of friction members may be employed instead of the band 37, the band 37 being merely illustrative of any suitable type of friction brake device.

The pressure cylinders 38 are suitably mounted on and secured, as by bolts 46, to a mounting plate or disc 47 having a central journal bearing 48 through which the armature shaft of the motor 25 extends for permitting rotation of the shaft relative to the plate 47. It should be understood that the bearing 48 may be a thrust bearing of any suitable type for holding the plate 47 against longitudinal movement on shaft 25. The mounting plate 47 has an upper portion 49 and a lower portion 51 which both project in the direction of the end of the armature shaft 25 substantially parallel thereto, a cover plate 52 being removably secured to the end of the portions 49 and 51 and having a central journal bearing 53 cooperating with the end of the armature shaft 25.

The brake band 37 is connected as by a rigid link 54, according to well known principles, to the lower portion 51 of the mounting plate 47, which link acts to cause an equal braking effect to be exerted on the brake drum 36 upon application of the band 37 thereto with a given force regardless of the direction in which the armature shaft and the brake drum 36 is rotated.

A bi-polar stator device 55, comprising a magnetic core piece 56 having enlarged pole portions 57 at opposite ends, is secured as by screws or bolts 58 on the inside face of the cover plate 54 in cooperative alignment within the brake drum 36, the core piece 56 further having an opening 59 in the enlarged central portion thereof through which the armature shaft 25 extends.

Electro-magnet coils 62 mounted in insulated relation on and surrounding the core piece 56 are provided for setting up a magnetic field flux in and around the stator device.

It will be understood that the brake drum member 36 functions in a dual capacity, namely as an operating part of the friction brake previously described and also as an operating part, that is rotor, of an eddy current brake in cooperative relation with the stator device 55.

Integrally formed on or separably secured to the cover plate 52 of the brake device 27, in axial alignment with the armature shaft 25, is a T-shaped member, hereinafter referred to as the torque head 63.

It will be apparent that upon application of the brake band 37 to the external periphery of the brake drum 36 or upon rotation of the brake drum through the magnetic field set up when the electromagnet coils 62 of the eddy current brake are energized, the mounting plate 47 would rotate in the direction of rotation of the armature shaft 25 unless restrained from doing so. I therefore provide yielding means as hereinafter described, to resist movement of the plate 47, hereinafter designated the torque plate 47, so that the degree of movement of the torque plate may be taken as a measure of the braking effect produced on the armature shaft and consequently the axle associated therewith.

Since the degree of rotary movement of the torque plate 47 is in accordance with the braking effect on the armature shaft and axle, variations in the coefficient of friction between the brake band 37 and the brake drum 36, which coefficient is a function of the braking effect, are automatically taken into account, in the braking effect measured.

In accordance with my invention, the torque head 63 on the cover plate 52 of torque plate 47 serves to transmit the torque force to the measuring device 33, shown in Fig. 1, for either direction of rotation of the armature shaft 25.

Referring to Fig. 1, the device 33 comprises a coil spring 66 hereinafter termed the torque spring, disposed within a chamber 67 in the casing 32 and subject at opposite ends to the opposing forces of the torque exerted by the torque heads 63 of the brake devices 27 and 28 respectively whereby the rotary movement of torque plate 47 is yieldingly resisted. Any suitable means may be provided for transmitting the torque from the torque heads 63 to the torque spring 66, an illustrative mechanism being shown which comprises, in the case of the torque head 63 of the brake device 27, a bell-crank lever 69 pivotally mounted at the fulcrum thereof, as by a pin 71, on a projecting lug 72 formed on the casing 32, the outer end of one arm 73 of the bell crank lever having a rod 74 pivotally connected thereto as by a clevis 75 on the rod and a pin 76 which extends through the clevis and an elongated hole 77 in the end of the lever arm 73. The opposite end of the rod 74 has an enlarged end portion 78 formed thereon, which is in the shape of a semi-disc, the flat end of the semi-disc cooperatively engaging the side surface of the torque head 63, as shown in Fig. 5. The rod 74 is slidably mounted in suitable journal members 81 fixed to a portion 82 of the truck frame. The outer end of the other arm 83 of the bell-crank lever 69 has a rod 84, hereinafter termed a torque rod, pivotally connected thereto, as by a clevis 85 secured to one end of the rod 84 and a pin 86 extending through the clevis and an elongated hole 87 at the end of the lever arm 83. The other end of the rod 84 extends into the casing 32 and has an enlarged head portion 88 which engages one face of a follower member 89, a recess 91 formed at the opposite face of the follower 89 being provided for receiving one end of the torque spring 66.

The mechanism, whereby the torque on the torque head 63 of the brake device 28 is transmitted to the opposite end of the torque spring 66 being identical with that just described for brake device 27, it is deemed unnecessary to repeat the description thereof except to note that corresponding parts are designated by corresponding numerals with the suffix "a".

Arranged in concentric relation to the torque rod 84 within the casing 32, are a pair of tubular stop members 94 and 95, the stop member 94 having at one end an inwardly extending flange 96 which engages the face of the follower 89, and at the opposite end an outwardly extending flange 97 which engages in contacting relation with an outwardly extending flange 98 on one end of the stop member 95. Disposed within the tubular stop member 94 and surrounding the head portion 88 on the torque rod 84 is a coil spring 99 which is interposed between the inwardly extending flange 96 of the stop member 94 and the flange 98 of the stop member 95 for urging stop member 94 away from the stop member 95, the flange 97 on the stop member 94 being adapted to engage a stop lug 101 on casing 32 to limit the movement of the stop member 94 away from the stop member 95. A coil spring 102, which surrounds the stop member 95 and which is interposed between the flange 98 on the stop member 95 and an annular shoulder 103 on the casing 32, urges the stop member 95 into contacting relation with the stop member 94, movement of the stop member 95 in the direction of the stop member 94 being limited by an outwardly extending flange 104 at the end of the stop member 95 opposite to the flange 98, which flange 104 is adapted to engage the shoulder 103.

In a similar manner the torque rod 84a has a pair of stop members 94a and 95a arranged in concentric relation thereto in the manner corresponding to that of the stop members 94 and 95 with respect to rod 84. The stop members 94a and 95a and associated parts are identical in construction and arrangement to the stop members 94 and 95 already described, and it is deemed unnecessary to repeat the description thereof except to note that corresponding structure or elements are designated by corresponding numerals with the suffix "a".

Pivotally connected to the follower 89, as by a pin 106, is a link 107 and, similarly, pivotally connected to the follower 89a, as by a pin 108, is a link 109, the other ends of the links 107 and 109 being pivotally connected as by a pin 110 on which is mounted a roller 111. A rod 113 is slidably mounted on the casing 32, as by brackets 114, and has an enlarged head portion 112 on one end thereof which is engaged in contacting relation by the roller 111.

The followers 89 and 89a each have a roller 116 mounted thereon as by a pin 117, the rollers 116 being adapted to roll along a guiding surface 118 on the casing 32, whereby upon movement of the followers 89 and 89a toward each other the position of the follower members is so maintained that the angle between the links 107 and 109 is decreased and the roller 111 moves correspondingly in a lateral direction away from the torque spring 66 to cause corresponding sliding movement of the rod 113.

Disposed within the chamber 67 of the casing 32 and mounted in insulated relation on the casing are two groups 121 and 122 of switches, group 121 comprising a plurality of switches 123, 124, 125, 126, and 127 (see Fig. 6) which are operated simultaneously by movement of the follower 89 and the group 122 comprising a plurality of switches 133, 134, 135, 136, and 137 (see Fig. 7) which are operated simultaneously by movement of the follower 89a. The individual switches constituting the groups 121 and 122 may be of any suitable type and are illustrated as being of the telephone type. It is deemed unnecessary, therefore, to specifically describe the construction of the switches of groups 121 and 122 except to point out that the movable operating members of the individual switches in each group 121 and 122 are mechanically connected, as by rigid tie rods 129 and 129a, which are indicated by a broken line in Figs. 6 and 7 respectively, and are thus simultaneously actuated. As indicated in Fig. 1, a lug 123 may be provided on each of the followers 89 and 89a which lug operatively engages the operating member of one of the individual switches and thus actuates all of the operating members of the individual switches in the corresponding group 121 or 122 by means of the tie rod 129 or 129a.

The parts of the device 33 for measuring braking effect are normally positioned as shown in Fig. 1, the tension of the torque spring 66 being such that it normally overcomes the tension of the springs 99 and 99a so that the stop members 94 and 94a are urged into contacting relation with the stop members 95 and 95a, respectively. The tension of the springs 102 and 102a is greater than that of the torque spring 66, and the stop members 95 and 95a are thus maintained in the extreme centerward position shown in Fig. 1. With the parts of the device 33 in the position shown in Fig. 1, the switch groups 121 and 122 are conditioned in a central position wherein the individual switches thereof are open or closed, as indicated in the chart shown in Fig. 8.

If the torque forces transmitted to the opposite ends of the torque spring 66, through the torque rods 84 and 84a are substantially equal, the spring 66 is contracted inwardly to an equal extent at the opposite ends thereof and the springs 99 and 99a thus become effective to urge the stop members 94 and 94a, respectively, in an inward direction to an extent determined by the engagement of the flanges 97 and 97a with the stop lugs 101 and 101a, respectively. With the stop members 94 and 94a positioned as just described, the inward recession of the followers 89 and 89a is such that the individual switches in groups 121 and 122 assume an inner position, the individual switches of each group being open or closed as indicated in the chart shown in Fig. 8. Further increase in the torque forces applied to opposite ends of the torque spring 66 beyond the degree sufficient to permit maximum inward movement of the stop members 94 and 94a causes further compression of the torque spring 66 and a corresponding inward movement of the followers 89 and 89a out of engagement with the flanges 96 and 96a of the stop members 94 and 94a respectively.

If the torque forces transmitted through torque rods 84 and 84a should become unbalanced, the torque spring 66 and the associated followers 89 and 89a will be shifted as a unit in the direction of the unbalanced force until such unbalance becomes counteracted by force exerted through the stop member 94 or 94a on the side of the lesser torque. Inasmuch as springs 99 and 99a are compressively tensioned a certain amount even when the stop members 94 and 94a are at their inward limit, it follows that the torque forces must be unbalanced more than a predetermined low amount sufficient to overcome the tension of either spring 99 or 99a before the corresponding follower 89 or 89a may be shifted outwardly after reengaging the stop members 94 and 94a respectively. As the unbalance in the torque forces transmitted through the rods 84 and 84a increases above the predetermined low amount just described, no further outward movement of the followers 89 or 89a will occur until the unbalance in the torque forces exceeds predetermined value considerably higher than the predetermined low value, at which either the spring 102 or 102a which is on the side of the lesser torque will be compressed. It will be seen, therefore, that group switches 121 and 122 will both remain in their inner positions if the torque forces transmitted through the rods 84 and 84a differs only by a small amount, that the one of the group switches 121 or 122 on the side of the lesser torque will be actuated to its central position upon an intermediate amount of unbalance in the torque forces, and that the one of the group switches 121 or 122 on the side of the lesser torque will be shifted to its outer position upon the occurrence of a large amount of unbalance in the torque forces. The switch group 121 or 122 on the side of the greater torque force will, of course, remain in its inner position.

It is important to observe that the torque spring 66 is shortened in length an equal amount whether both of the brake devices 27 and 28 are effective to cause equal and opposite torque forces to be applied to opposite ends of the spring 66 through the rods 84 and 84a or whether either of the brake devices 27 and 28 acting alone, exert the same force as when both were effective. It follows, therefore, that the degree to which the spring 66 is shortened in length is a measure of the greater of the forces applied thereto from the brake devices 27 and 28 and accordingly that the degree of movement of the rod 113, effected by relative movement of the followers 89 and 89a toward each other and the corresponding change in the angular position of the links 107 and 109, is a measure of the greater of the torques and therefore of the greater of the braking effects exerted by the brake devices 27 and 28.

It is also important to observe that a difference in the torque forces applied to opposite ends of spring 66 causes bodily shifting of the spring 66 in the direction of application of the greater torque force and to an extent determined by the degree of the difference in the torque forces, the followers 89 and 89a being accordingly moved to actuate the switch groups 121 and 122 for purposes of brake control hereinafter described.

It should also be observed that the degree of rotary movement permitted to the torque head 63 associated with each of the brake devices 27 and 28 is limited to such a small angle and the system of levers including the rods 74 and 84 is so arranged as to prevent any wedging action. Furthermore, since the degree of such angular displacement of the torque head 63 from the normal position thereof is so small, the force applied by the torque head 63 to the head portion 78 (or 78a) on the rod 74 (or 74a) is maintained substantially equal to the entire torque force, with negligible variation in accordance with the cosine function of the angle of displacement of the torque head 63.

Referring to Fig. 1, the load measuring device 34 comprises a piston cylinder 141 embodied in casing 32 and containing a piston 142 having a piston stem 143 which slides in a bore 144 of reduced diameter. In the bore 144 is disposed a dash-pot piston 145 and interposed between the piston 145 and the inner end of the stem 143 is a coil spring 146 which acts normally to urge the piston 145 and the piston 142 into the position shown in Fig. 1, assuming no load on the truck except the weight of the car body. A lever 148 is pivotally connected at one end to the stem 143, through a connecting link 147, and a lever 149 is pivotally connected at one end to the free end of the lever 148 as by pin 151. The opposite end of the lever 149 is secured to a rotatable shaft or pin 152, to which is also secured an arm 153 which extends through an opening 154 in the wall of the casing 32 to the exterior of the casing. The exterior end of the arm 153 is pivotally connected to a rod 155, as by a ball-and-socket joint 156, the rod 155 also being pivotally connected to the outer end of one arm of a bell-crank 157 (see Fig. 2), which is pivotally mounted at the fulcrum thereof, as by a pin 158, to a portion 159 of the car frame, the outer end of the other arm of the bell crank 157 having a roller 161 mounted thereon adapted to engage a fixed surface 162 on a portion of the truck frame.

A lever 164 pivotally mounted on a fixed pin 165 carried by the casing 32 is pivotally connected at one end by a link 166 to the piston 145, the opposite end of the lever 164 having one end of a lever 167 pivotally connected thereto. The opposite or free end of the lever 167 carries a roller 168 adapted to roll along a guide 169 carried on the casing 32. The lever 164 carries an arm 171 which is provided at the free end thereof with a toothed segment 172. A lever 173 connects the levers 164 and 148, being pivotally connected at opposite ends thereof to the said levers.

A rocker arm 174 is pivotally mounted at the fulcrum thereof on the casing 32, as by a pin 181, the outer end of one arm being provided with teeth for engaging the toothed segment 172, and the outer end of the other arm being pivotally connected to the outer end of a stem 175 of a piston 176 contained in a bore or chamber 177 in the casing 32. A coil spring 180, in the bore 177, is so interposed between the piston 176 and the casing as to yieldingly urge the piston 176 in a direction to cause the teeth on the one arm of the rocker arm 174 to engage the toothed segment 172 to hold lever 164 against movement.

A weighing beam or lever 178 is provided and at a point intermediate the ends of lever 178 is pivotally connected one end of a lever 179, the opposite end of the lever 179 being pivotally mounted on the casing 32, as by the same pin 181 on which the rocker arm 174 is mounted. The weighing beam 178 is so disposed as to contact the roller 168 on the lever 167 at a point diametrically opposite to the point of contact of the roller with the guide 169. The weighing beam 178 is provided at one end with an elongated hole 183 and at the opposite end with an elongated hole 184.

A rod 186, hereinafter termed a rack rod, is pivotally connected at one end thereof to one end of the weighing beam 178, as by a pin 187 extending through the hole 183 in the weighing beam, and is slidably mounted on the casing 32, as by one or more brackets 188, the opposite end of the rod 186 being provided with a gear rack portion 189 having cooperative engagement with a pinion gear 191 secured to the outer end of a shaft 192 on which is carried a segment drum 193 (illustrated diagrammatically in Fig. 6), of a controller device 194 suitably carried on the casing of the operating mechanism 31. A spring 196, interposed between the casing 32 and a collar 197 secured to the rack rod 186, normally urges the rod 186 inwardly of the casing 32 to position the segment drum 193 of the controller 194 in a normal position which will be hereinafter described.

A rod 201 slidably mounted on the casing 32, as by one or more brackets 202, is pivotally connected at one end to the opposite end of the weighing beam 178, as by a pin 203 extending through the hole 184. The opposite end of the rod 201 is provided with an enlarged rounded head 204, which is operatively engaged by the outer end of one arm of a bell-crank 206 pivotally mounted at the fulcrum thereof on the casing 32, the outer end of the other arm of the bell-crank 206 being operatively engaged by the end of the rod 113 opposite to that having the head 112 which is engaged by the roller 111.

A magnet valve device 208 is provided for controlling the supply and the release of fluid under pressure to and from the piston cylinder 141 and piston chamber 177. The magnet valve device 208 is normally energized, in a manner hereinafter described, so that fluid under pressure is vented from the piston cylinder 141 and piston chamber 177 while the vehicle or train of cars is in motion, and is deenergized when the vehicle or train of cars is brought to a stop for supplying fluid under pressure to the cylinder 141 and chamber 177.

Fluid under pressure, supplied to the piston chamber 177 from the supply pipe 211 through magnet valve 208 and pipe and passage 212 overcomes the force of the spring 180 opposing movement of the piston 176 and thus actuates the piston 176 to rock the rocker arm 174 out of engagement with the toothed segment 172 on the lever arm 171. Fluid under pressure, supplied to the piston cylinder 141 from the pipe and passage 212 through the branch passage 214 moves the piston 142 to the left, as viewed in Fig. 1, against the force of the spring 146.

The tension of the springs 146 and 180 is such that a higher fluid pressure per square inch is required to move the piston 177 than to move the piston 142. Consequently the spring 180 maintains the rocker arm 174 in engagement with the toothed segment 172 on the lever arm 171 so that the lever 164 is held against movement while the piston 142 moves inwardly. The lever 173, being secured to lever 164 is thus also held against movement, and the inward movement of the piston 142, occasioned by the pressure of the fluid supplied to the piston cylinder 141, rocks the lever 148 pivotally on the end of the lever 173 thus causing the lever 149 to be pivotally moved about the pin 152 through an angle in a clockwise direction, as viewed in Fig. 1. The lever 149, in turn, effects corresponding rotation of the pin 52 and arm 153, and rod 155 is thus moved upwardly in Figure 1 and in the left-hand direction in Figure 2 to cause rotation of the bell-crank 157 in a clockwise direction, as viewed in Fig. 2, to move the roller 161 into engagement with the surface 162 on the truck frame.

Subsequent to the operation just described, the pressure of the fluid supplied to the piston chamber 177 becomes effective to move the piston 176 against the resistance of the spring 180 and thus effects movement of the rocker arm 174 out of engagement with the toothed segment 172 on the arm 171.

The rod 155 is now free to move in accordance with the load on the wheel-truck. If the load on the truck is increased, the distance between the car frame portion 159 and the surface 162 on the truck frame is lessened, and the bell-crank 157 is accordingly rotated in a counterclockwise direction to effect movement of the rod 155 to the right, as viewed in Fig. 2.

Since the piston 142 is held in its inner position by the pressure of the fluid supplied to the piston cylinder 141, the movement of the rod 155, with an increase in load, through the arm 153 and lever 149 effects a counterclockwise movement of the lever 148 about the point of pivotal connection to the link 147 and thus, through the lever 173, effects a counterclockwise movement of the lever 164 about the fixed pin 165. The lever 167 is thus moved, with the lever 164, to the left as viewed in Fig. 1, to adjust the position of the fulcrum roller 168 in accordance with the load on the wheel-truck.

It will be apparent that if the load on the wheel truck is decreased. the spring 146 will urge the dash-pot piston 145 to the left, as viewed in Fig. 1, and consequently effect clockwise rotation of lever 164 on the pin 165 so that the fulcrum roller 168 will accordingly be moved to the right, as viewed in Fig. 1, and the rod 155 will be moved to the left, as viewed in Fig. 2, until the roller 161 on the rocker arm 157 again contacts the truck portion 162.

When motion of the vehicle or train of cars is initiated and fluid under pressure is released from the piston chamber 177 of the piston cylinder 141, the spring 180 becomes first effective, as the fluid pressure is decreased, to rock the rocker arm 174 into engagement with the toothed segment 172 to lock the lever arm 171 against movement. Subsequently, as the fluid pressure further decreases, the spring 146 moves piston 142 to the right, as viewed in Fig. 1, and since the lever 173 is held against movement, the lever 148 is rocked about the end of the lever 173 to cause a counterclockwise movement of the lever 149 and the arm 153, which results in counterclockwise movement of the bell crank 157, as viewed in Fig. 2, so that the roller 161 is moved out of engagement with the contact surface 162 on the truck frame. The load measuring device 34 is thus rendered unresponsive to the normal relative movement of the car frame portion 159 and the truck frame portion 162 during the time that the vehicle or train of cars is in motion.

The cooperative relation of the device 33 for measuring braking effect, and the load measuring device 34 should now be apparent. Whenever the rod 113 is moved to the right, as viewed in Fig. 1, which as will be explained hereafter in greater detail occurs upon an application of the brakes to either one or both the axles 15 and 16, the bell-crank lever 206 is rocked in a clockwise direction and thus through the rod 201 causes a counterclockwise rocking movement of the weighing beam 178 about the roller 168 as a fulcrum, the rack rod 186 being accordingly moved against the force of the spring 196 to cause rotation of the segment drum of the controller 194. The tension of the spring 196 is such that for a given position of the fulcrum roller 168 and a given force urging the rod 113 to the right, a corresponding movement of the segment drum of the controller 194 will be effected.

If the fulcrum roller 168 is positioned, in accordance with the degree of the load on the wheel-truck, to the left of the position shown in Fig. 1, a greater force must necessarily be applied to the rod 113 to effect the same degree of rotation of the segment drum of the controller 194, due to the shortening of the moment arm extending from the fulcrum point of contact between the roller 168 and the weighing beam 178 to the pin 203.

Conversely, if the fulcrum roller 168 is positioned in any position to the right of that shown in Fig. 1, as for a decrease in the load on the wheel-truck, a lesser force is required to be applied to the rod 113 to effect the same degree of rotation of the segment drum of the controller 194, due to the lengthening of the moment arm extending from the fulcrum point on the roller 168 to the pin 203.

Referring to Figs. 6 and 7 taken together, additional equipment of my invention includes one or more main reservoirs, such as the reservoir 221, disposed on one or respectively on more than one of the cars of the train, a main reservoir pipe 222 connected to the main reservoir 221 and extending in the usual manner throughout the length of the train, the pipe 222 also being connected to other main reservoirs if employed on other cars, a plurality of control wires 224, 225, 226, 227 and 228 extending in usual manner throughout the length of the train, a manually operable brake switch device 229 located on the control car of the train and adapted to effect energization of train wires 224 to 228, a vibration relay device 231 of the type shown and described in my copending application Serial No. 734,781 filed July 12, 1934, and assigned to the assignee of the present application, and a suitable generator 232 located on one of the cars of the train and adapted to supply power to all of the cars through a train wire 233 extending throughout the length of the train, the wire 233 being connected to one terminal of the generator and the other terminal of the generator being connected to ground, as shown, or to a return train wire if desired. Although wire 233 is illustrated as being energized from generator 232, it is to be understood that it might, instead, be energized from a trolley or third rail, the same as are the driving motors.

An electromagnet switch device 234, which is controlled by the vibration relay device 231 in a manner hereinafter described, controls the connection from a suitable source of electrical energy, such as a battery 235, to another train wire 236 which extends, in usual manner, throughout the length of the train. each individual magnet valve device 208 associated with the load measuring device 34 on each wheel-truck being connected to and energized by current supplied over the wire 236. as hereinafter described.

An emergency relay switch device 238, located preferably on the control car of the train, is provided for connecting train wires 227 and 228 to the battery 235 independently of the brake switch device 229. A "deadman's" switch device 239, which may be combined with the usual motor controller device in customary manner but here illustrated merely as a push button switch to be held normally closed by the operator. and a plurality of conductor's switch devices 241, (only one of which device is shown) one for each car of the train, control the circuit of the magnet coil 242 of the relay device 238, the devices 239 and 241 being effective to interrupt the flow of current through a train wire 243 which extends throughout the length of the train and which is grounded at its termination on the last car in manner not shown. If a battery return wire is employed, then the wire 243 is connected thereto on the last car instead of to ground.

A signal lamp 511, located on the control car, has one terminal connected to ground and the other to a train wire 522 extending throughout the length of the train, the wire 522 being connected to battery upon the occurrence of wheel-sliding on any of the wheel-trucks, in the manner hereinafter described, the circuit being thus closed through the lamp to cause the lamp to be illuminated and indicate the wheel-sliding condition.

For the sake of simplicity, additional brake operating and control equipment local to each individual wheel-truck, on every car of the train is illustrated for one wheel-truck only.

The local brake control equipment for each of the brake devices 27 and 28 associated respectively with the wheel axles 15 and 16 of each wheel-truck are identical in construction and the local brake control equipment for the brake device 27 is thus illustrated in detail in Fig. 6 whereas the local brake control equipment for the brake device 28 is shown merely in outline form in Fig. 7. Referring then to Fig. 6, the local control equipment for the brake device 27 includes an application magnet valve device 248, a release magnet valve device 249, a pneumatic switch device 251, a volume reservoir 252, a fluid pressure operated relay device 253 for controlling the supply and release of fluid under pressure to and from the pressure cylinders 38 of the brake device 27, a rheostat 254 for controlling the degree of the current supplied to the coils 62 of the eddy current brake portion of brake device 27 and operated by a fluid pressure responsive device, such as the diaphragm device 255, through the medium of a pressure-limiting device 256, and a relay device 257 for controlling a circuit including the rheostat 254 and the coils 62 of the eddy current brake device previously described.

The brake control equipment individual to each of the brake devices 27 and 28 also includes a pneumatic switch device 259, a timing reservoir 261, a fluid pressure operated relay device 262 for controlling the supply of fluid under pressure from a local reservoir 263 to another pneumatic switch device 264, and a magnet valve device 265 for controlling the supply of fluid under pressure to the pneumatic switch device 259 and the relay device 262. The application and release magnet valve devices 248 and 249 are controlled, as will be hereinafter described in detail, by the controller device 194 previously mentioned and associated with the load measuring device 34.

The application magnet valve device 248 comprises an electromagnet 271 and a valve 272 actuated by the electromagnet 271 through a stem 273. The valve 272 is disposed in a chamber 274 which is in constant communication with the pipe 222 through a branch pipe 275, and when the electromagnet 271 is deenergized the valve 272 is yieldingly urged into seated relation on an associated valve seat by a coil spring 276 interposed between the valve and a screw plug 277 closing the chamber 274. When the electromagnet 271 is energized the valve 272 is unseated against the force of the spring 276 and communication is thus established from the chamber 274 to a chamber 278 into which opens a pipe and passage 279 leading to the reservoir 252.

The release magnet valve device 249 comprises an electromagnet 281 and a valve 282 actuated by the electromagnet 281 through the medium of a stem 283. The valve 282 is disposed in a chamber 284 constantly open to atmosphere through a port 285 and is provided with a fluted stem 287 which extends through a bore 286 in the casing into a chamber 288. When the electromagnet 281 is deenergized the valve 282 is unseated from its associated valve seat to establish communication between chambers 284 and 288 through bore 286 by a coil spring 289 in the chamber 288, which spring is interposed between a collar on the end of the fluted stem 287 of the valve 282 and a screw plug 291 closing the chamber 288. Chamber 288 is constantly in communication with pipe and passage 279 through a branch passage 292 and thus, when the valve 282 is unseated, the passage and pipe 279 is connected to atmosphere.

The pneumatic switch device 251 comprises a casing 294 having a piston chamber 295 containing a piston 296 which actuates a movable switch member 297 through the medium of a stem 298. A coil spring 299 interposed between one face of the piston and the casing 294 normally urges the piston 296 in such direction as to move the switch member 297 into circuit-opening position. Fluid under pressure is supplied to the piston chamber 295 from the pipe 279 through a branch pipe 301, and the tension of the spring 299 is such that when the pressure of the fluid supplied into the pipe 279 under the control of the application magnet valve device 248 attains a degree, such as three pounds per square inch, the piston 296 is actuated against the resistance of spring 299 to move the switch member 297 into circuit-closing position.

The pneumatic relay device 253 comprises a casing 303 containing a piston 304 having a chamber 305 at one side thereof, which chamber is constantly subject to the pressure of fluid in local reservoir 252 through a branch pipe 306 which opens into pipe 279 leading to the reservoir 252, and a chamber 307 at the opposite side thereof in which is disposed a slide valve 308 adapted to be operated by the piston through the medium of a stem 309. The stem 309 is provided with spaced collars or lugs 310 and 311 adapted to engage opposite sides of the slide valve 308 and so spaced as to permit a certain amount of movement of the stem 309 relative to the slide valve 308. The stem 309 is provided at the end thereof with a collar 312 which extends into a reduced portion of the chamber 307, and a coil spring 313 disposed in the reduced portion of the chamber 307 between the collar 312 and the casing 303 resists movement of the piston 304 and slide valve 308 to the right, as viewed in Fig. 6, until the pressure of the fluid supplied to the piston chamber 305 exceeds a predetermined degree, such as forty pounds per square inch. The slide valve 308 is normally positioned, as shown, to lap or cover an inlet passage 314 to which the pipe 279 is connected and to uncover an atmospheric exhaust passage 315 opening into the chamber 307. The supply conduit 43 leading to the pressure cylinders 38 of the braking device 27 opens into the chamber 307 and, with the exhaust port 315 uncovered, fluid under pressure is accordingly released from the pressure cylinders 38. In order to resist unseating of the slide valve 308 due to the pressure of the fluid in the pipe 279 acting through inlet port 314 on the seated face of the slide valve 308, a spring biased roller 316 is provided in well known manner for engaging the upper surface of the slide valve 308.

When the pressure in chamber 305 is sufficient to cause the slide valve 308 to be shifted to the right, the slide valve first laps or covers the exhaust port 315 and then opens or uncovers the inlet port 314, thereby causing fluid under pressure to be supplied from local reservoir 252, through pipe 279 and port 314 into slide valve chamber 307 and thence to the pressure cylinders 38 through supply conduit 43. When the brake cylinder pressure in chamber 307 plus the force of spring 313 becomes slightly greater than local reservoir pressure the slide valve 308 is shifted back to the left to lap the inlet port 314 without uncovering the exhaust port 315. Upon a decrease in local reservoir pressure, the slide valve 308 is shifted further to the left to the position shown, and fluid under pressure is released from the cylinders 38 until the combined force of spring 313 and fluid pressure in chamber 307 is less than the local reservoir pressure. Slide valve 308 is then shifted to the right to lap the exhaust port 315 without opening the inlet port 314. The valve device 253 thus regulates the pressure of fluid supplied to the cylinders 38 to a substantially uniform value, such as forty pounds per square inch, less than the local reservoir pressure, depending upon the tension of spring 313.

The rheostat 254, illustrated as of the carbon-pile type, comprises a tubular casing 318 of insulating material suitably mounted on the car frame or wheel-truck and containing a plurality of carbon blocks or discs 319, one end block being connected to a wire 321 leading to the eddy current brake coil 62 of the brake device 27 and the other end block being connected by wire 322 to one of the switch contact members 323 of the relay device 257. A piston 324 contained in the casing 318 at one side of the stack of carbon blocks 319 and suitably insulated from the blocks, as by an insulating washer 320, is provided with a stem 325 extending to the exterior of the casing 318 and having a cup shaped portion 326 constituting the casing of the pressure-limiting device 256.

The device 255 may be of any suitable character for applying or transmitting pressure and is illustrated as comprising a separable casing 328 having a flexible diaphragm 329 clamped at its periphery between the parts of the casing 328 and having a chamber 331 at one side thereof which is supplied with fluid under pressure from the pipe 279 through a branch pipe 332. Disposed in a chamber 333 at the opposite side of the diaphragm 329 is a follower 334 having a stem 335 extending to the exterior of the casing 328. The stem 335 has a collar 336 secured to the end thereof and contained in the casing 326 of the pressure-limiting device 256. A coil spring 337 contained within the casing of the device 256 and interposed between the collar 336 and the casing is so tensioned that when the pressure of the fluid in the chamber 331 acting on the diaphragm 329 exceeds a predetermined value, such as forty pounds per square inch, which pressure is substantially the same pressure as that required before operation of the relay device 253 is permitted, the spring 337 yields sufficiently to permit follower 334 on stem 335 to engage the casing 328 of pressure device 255 and thus effectively limit the application of further pressure on the carbon blocks 319 of the rheostat 254.

The reservoir 252 is provided for adding volume capacity to the chamber 331 of the diaphragm device 255, piston chamber 295 of the pneumatic switch device 251 and the piston chamber 305 of the relay device 253, the reservoir being connected to the pipe 279 through the branch pipe 339.

The pneumatic switch device 259 is similar to the pneumatic switch device 251 and comprises a casing 341 containing a piston 342 operative to move a switch member 343 through a stem 344, the piston 342 being normally biased to a position for moving the switch member 343 to circuit-opening position by a coil spring 345 interposed between one face of the piston 342 and the casing 341. When fluid under pressure is supplied to a chamber 346 at the opposite side of the piston 342, the piston 342 is actuated, against the force of the spring 345, to move the switch member 343 to circuit-closing position.

The magnet valve device 265 comprises an electromagnet 348 adapted to actuate a pair of oppositely seating valves 349 and 351 through the medium of a stem 352. The valve 349 is disposed in a chamber 353 which is constantly open to atmosphere through a port 354, and the valve 351 is disposed in a chamber 355 which is in constant communication with the main reservoir pipe 222 through a pipe 356 and branch pipe 357. The valves 349 and 351 are each provided with fluted stems which meet in end-to-end contacting relation within a chamber 359 intermediate of the chambers 353 and 355, the chamber 359 being connected to a pipe 361 which is connected to the piston chamber 346 of the pneumatic switch device 259 through a branch pipe 362. A coil spring 363 disposed within the chamber 355 and acting on the valve 351 yieldingly urges the valve 351 into seated position and the valve 349 into unseated position when the electromagnet 348 is deenergized. When the electromagnet 348 is energized, the valves 349 and 351 are actuated, against the force of the spring 363, into seated and unseated positions respectively. It will be apparent, therefore, that the magnet valve device 365 controls the supply of fluid under pressure from the main reservoir pipe 222 into the pipe 361 and the exhaust of fluid under pressure from the pipe 361.

The valve device 262 comprises a casing containing a piston 366 having a stem 367 for actuating a pair of oppositely seating valves 368 and 369 contained within a chamber 371 in the casing, which chamber is constantly connected to the reservoir 263 through a pipe 372. Each of the valves 368 and 369 is provided with a fluted stem at one side thereof, the stems meeting in contacting end-to-end relation within the chamber 371. The valve 369 is also provided with a fluted stem at the other side thereof which extends through a bore in the casing into a chamber 374. A coil spring 375 disposed in the chamber 374 and acting on the end of the fluted stem of valve 369 yieldingly urges the valves 368 and 369 into seated and unseated positions, respectively, so that communication is established from the chamber 374, which is in constant communication with the main reservoir pipe 222 through the pipe 356, to the chamber 371 and the reservoir 263. At one side of the piston 366 is a chamber 376 which is supplied with fluid under pressure from the pipe 361 to actuate the piston 366 to move the valves 368 and 369, against the force of the spring 375, to unseated and seated positions respectively. When the valve 368 is unseated it establishes communication from the chamber 371 to a chamber 377 at the other side of the piston 366, the chamber 377 being constantly connected to atmosphere through a pipe 378 havin ga restricted portion or choke 379 at the end thereof.

The reservoir 261 is connected to the pipe 361 through a branch pipe 381 at a point between the connection of the branch pipe 362 to the pipe 361 and the valve device 262. The pipe 361 is provided, at the portion thereof between the points of connection of the branch pipes 362 and 381 thereto, with a restricted portion or choke 382, whereby the charging of the reservoir 261 and the operation of the valve device 262 is calculated to take place a predetermined time interval after the operation of the pneumatic switch device 259.

The pneumatic switch device 264 comprises a casing 384 containing a piston 385 having a stem 386 for actuating a pair of movable switch members 387 and 388 suitably insulated from each other. At one side of the piston 385 is a coil spring 389 for biasing the piston 385 to a position such that the switch member 387 is in circuit-opening position and the switch member 388 is in circuit-closing position in engagement with a fixed contact member 391. At the opposite side of the piston 385 is a chamber 392 which is supplied with fluid under pressure through a branch pipe 393 connected to the pipe 378 at a point between the choke 379 and the valve device 262. When the piston 385 is actuated by the pressure of the fluid supplied to the chamber 392, the switch member 387 is moved to circuit-closing position and the switch member 388 is moved to disengage the contact member 391 and to engage another contact member 394.

The volume of the reservoir 263 and the size of the choke 379 are such that when the valve device 262 is operated to supply fluid under pressure from the reservoir 263 into the pipe 378 the piston 385 of the pneumatic switch device 264 is actuated to the position last described and maintained in such position for a predetermined length of time determined by the time required for the pressure in the reservoir 263 and effective in chamber 392 on the piston 385 to be sufficiently reduced through choke 379 to permit the spring 389 to move the piston 385 and switch members 387 and 388 to the normal position shown in Fig. 6.

Since the control equipment individual to the brake device 28 associated with the axle 16 is a duplicate of that desecribed above for the brake device 27 associated with the axle 15, the description of the parts shown in Fig. 7 for the brake device 28 is not repeated except to note that corresponding devices or elements are designated by numerals corresponding to those employed for the brake device 27, with the suffix "a" added thereto.

Referring to Fig. 6, the brake switch device 229 may be of any suitable character adapted for manual operation, the device being illustrated diagrammatically as comprising a plurality of fixed contact members 401, 402, 403, 404, 405 and 406 arranged in a row, and a movable stepped contact segment 407 adapted to be manually moved to the right, as viewed in Fig. 6, to connect the contact member 401 to the contact members 402, 403, 404, 405 and 406 in succession depending upon the degree of displacement of segment 407 from the normal release position indicated in the drawing. The contact member 401 is constantly connected to the positive terminal of the battery 235 by wires or conductors 408, 409, 410 and 411, and the train wires 224, 225, 226, 227 and 228 are connected, respectively, to the contact members 402, 403, 404, 405 and 406. It will thus be apparent that depending upon the degree of operative movement of the brake switch device 229 from the normal release position, one or more of the wires 224 to 228 will be connected to the positive terminal of the battery 235.

The controller 194, associated with the load measuring device 34 shown in Fig. 1, is shown diagrammatically in Fig. 6 as comprising a rotary drum 193 on which are mounted in insulated relation a pair of stepped contact segments 413 and 414, the segments being shown in developed form. The controller 194 also comprises a group of fixed insulated contact members 415, 416, 417, 418, 419 and 420 arranged in a row and all normally engaged by the segment 413. The contact members 415, 416, 417, 418 and 419 are constantly connected to the train wires 224, 225, 226, 227 and 228, respectively, by branch wires 421, 422, 423, 424 and 425, the contact member 420 having a wire 426 connected thereto which is in turn connected to a wire 427 connected to the contact member 391 of the pneumatic switch device 264 and contact member 391a of the pneumatic switch device 264a.

The controller 194 further comprises a group of fixed insulated contact members 431, 432, 433, 434, 435 and 436 arranged in a row and all normally engaged by the contact segment 414. The contact members 431, 432, 433, 434 and 435 are constantly connected to the train wires 224, 225, 226, 227 and 228, respectively, by branch wires 438, 439, 440, 441 and 442, the contact member 436 having a wire 444 connected thereto which is in turn connected to a wire 445 leading to one terminal of the electromagnet of the release magnet valve device 249 and also to one terminal of the electromagnet of the release magnet valve device 249a.

The contact members 415, 416, 417, 418, 419 and 420 are so disposed with respect to the contact segment 413 that the contact member 420 remains in constant engagement with the segment 413 while the contact members 415, 416, 417, 418 and 419 are successively disengaged therefrom, in the order named, upon rotation of the segment drum 193 from its normal position by operation of the operating mechanism 31 shown in Fig. 1.

The contact members 431, 432, 433, 434, 435 and 436 are so disposed with respect to the contact segment 414 that contact member 436 is constantly in engagement with the segment 414, whereas contact members 431, 432, 433, 434 and 435 are successively disengaged therefrom in the order named upon rotation of the segment drum 193 out of its normal position.

It is important to note that the contact segments 413 and 414 are not identical, the contact segment 413 disengaging its associated contact members 415, 416, 417, 418 and 419 whereas corresponding contact members 431, 432, 433, 434 and 435 remain in engagement with the contact segment 414 for the same degree of rotary movement of the segment drum 193. For example, for a given rotary movement of the segment drum 193 the contact segment 413 will disengage the contact member 415 whereas the contact member 414 still remains in engagement with the contact member 431 which is connected to the same train wire, namely wire 224, as is the contact member 415.

The terminal of the electromagnet of the magnet valve device 249 opposite to that to which the wire 445 is connected and one terminal of the electromagnet of the application magnet valve device 248 are connected by common wire 451 which is in turn connected by a wire 452 to the movable switch member 343a of the pneumatic switch device 259a, the other terminal of the electromagnet of magnet valve device 248 being connected by a wire 390 to the switch member 388 of pneumatic switch 264. A branch wire 453, connected to the wire 452, is normally connected to a ground wire 454 through the series related switches 126 and 125 of the group 121.

In a similar manner corresponding terminals of the electromagnets of the magnet valve devices 248a and 249a (see Fig. 7) are connected by a common wire 451a, which is in turn connected to a wire 452a leading to and connected to switch member 343 of the pneumatic switch device 259, the remaining terminal of the application magnet valve device 248a being connected by a wire 390a to switch member 388a of pneumatic switch 264a. Also, a branch wire 453a connects wire 452a to ground wire 454 through the series related switches 136 and 135 of the group 122.

The magnet valve device 208 (see Figs. 1 and 7), one of which is associated with each of the load measuring devices 34 for the wheel-trucks may comprise an electromagnet 457 for actuating a pair of oppositely seating valves 458 and 459 through the medium of a stem 461. The valves 458 and 459 are contained within a chamber 462 to which the pipe 212 leading to the load measuring device 34 is constantly connected, the valves 458 and 459 engaging each other in contacting relation within the chamber 462. The valve 459 is provided with a fluted stem 463 which extends through a bore in the casing into a chamber 464 which is constantly connected to the main reservoir pipe 222 by branch pipe 211, a biasing spring 466 within the chamber 464 cooperating with the end of the fluted stem 463 for yieldingly urging the valves 458 and 459 into seated and unseated positions, respectively, on associated valve seats, when the electromagnet 457 is deenergized. When the electromagnet 457 is energized, the valves 458 and 459 are shifted against the force of the spring 466 into unseated and seated positions respectively. The valve 459, when in seated position, cuts off communication between the chambers 464 and 462 and the valve 458, when unseated, opens communication from the chamber 462 to an atmospheric chamber 468. It will thus be apparent that the magnet valve device 208 controls the supply and release of fluid under pressure to and from the pipe 212 leading to the load measuring device 34.

The circuit for energizing the electromagnet 457 of the magnet valve device 208 is controlled by the relay 234, one terminal of the electromagnet 457 being connected to ground through a wire 469, the other terminal being connected by a wire 471 to the train wire 236, which is in turn connected by a wire 472 to a fixed contact member 473 of the relay 234. The relay 234 comprises an electromagnet coil 474 for actuating a movable bridging member 475 to interrupt the connection between the contact member 473 and another fixed contact member 476 which is connected to the positive terminal of the battery 235 through wires 410 and 411. When the electromagnet coil 474 is deenergized or energized insufficiently, the bridging member 475 falls into contacting relation with the contact members 473 and 476, thereby connecting train wire 236 to the positive terminal of battery 235 and completing the circuit for energizing the electromagnet 457 of the magnet valve device 208.

Energization and deenergization of the relay 234 is controlled by the vibration relay device 231.

The vibration relay device 231 comprises a tubular casing 478 of insulating material threaded internally at the opposite ends thereof for receiving metallic conducting screw plug members 479 and 480 respectively. The inner ends of the members 479 and 480 are coated, as by electrolytic deposition or by brazing, with some highly conductive material 477 such as silver, and a quantity of granules 481 of conducting material, such as carbon, is contained therebetween in the casing 478.

The screw plug member 480 is connected to the positive terminal of the battery 235 by wire 411 and the screw plug 479 is connected to one terminal of the coil 474 of the relay 234 by wire 484, the other terminal of the coil 474 being grounded by wire 485.

The vibration relay 231 is mounted on some part of the vehicle or train of cars which is subject to appreciable vibration during motion of the vehicle or train of cars.

When motion of the vehicle or car is stopped, the carbon granules 481 settle to the lower portion of the space between the screw plugs 479 and 480, the resistance through the granules between the screw plugs 479 and 480 being then such that the current through the coil 474 of the relay 234 is sufficient to pick up the bridging member 475 and thus interrupt the circuit for energizing the train wire 236 and accordingly that of the electromagnet of the magnet valve device 208 for each of the load measuring devices 34 for the wheel-trucks. When the vehicle is in motion the carbon granules 481 are vibrated and consequently separated, the resistance in the circuit of the coil 474 of relay 234 being thus so increased as to cause the current through the coil 474 to be sufficiently decreased as to be ineffective to maintain the bridging member 475 in picked-up or circuit-opening position. The circuit for energizing the electromagnet of the magnet valve device 208 on all the wheel-trucks is thus completed, when the vehicle or train of cars is in motion, by the dropping out of relay 234 to circuit-closing position.

OPERATION (a) *Substantial equality of braking effects on different wheels*

In operation, the main reservoir pipe 222 is initially charged with fluid under pressure from the main reservoir 221, the reservoirs 263 and 263a local to the wheel-trucks being accordingly charged with fluid under pressure from the pipe 222 under the control of the relay valve devices 262 and 262a, respectively. With the vehicle or train of cars stopped, fluid under pressure is also supplied from the pipe 222 to the piston cylinder 141 and piston chamber 177 of the load measuring device 34 under the control of the magnet valve device 208 for each wheel-truck, thereby causing the roller 161 on the bell crank 157 (see Fig. 2) to be moved into engagement with the contact surface 162 on the truck frame in readiness for adjusting the load responsive device 34 in accordance with the load placed on the wheel-truck.

When the vehicle or train of cars is in motion, the magnet valve device 208 for each wheel-truck is energized in the manner just previously described, to effect the release of fluid under pressure from the piston cylinder 141 and piston chamber 177 of the load responsive device 34 to cause latching of the load measuring device 34 in position and retraction of the roller 161 on the bell-crank 157 out of engagement with the contact surface 162 on the truck-frame.

With the vehicle or train of cars running along the road, the brake switch device 229 being in the release position thereof and the magnet valve devices 208 associated with the load measuring devices 34 all being energized, in the manner just described, if it is desired to effect a service application of the brakes, the brake switch device 229 is operated to select a desired degree of adhesion utilization or of braking effect, the position of the switch 229 being such for example, as to connect the three train wires 224, 225 and 226 to the positive terminal of the battery 235 in the manner previously described.

The application magnet valve device 248 and release magnet valve device 249 for the brake device 27 and the application magnet valve device 248a and the release magnet valve device 249a for the brake device 28 are accordingly energized in the following manner. The circuit for the release magnet 249 extends from the positive terminal of the battery 235 through wires 411, 410, 409 and 408, brake switch device 229, in parallel through the train wires 224, 225, 226 and branch wires 438, 439, 440 to the contact segment 414 on the segment drum 193 of the controller 194, and thence by way of wires 444 and 445, electromagnet 281 of the magnet valve device 249, wires 451, 452 and 453, switch 126 of the group 121, wire 491, switch 125 and wire 454 to ground, the return circuit to the grounded negative terminal of the battery 235 being thus established.

The circuit for energizing the application magnet valve device 248 extends from the contact segment 413 of the controller 194, (the contact segment 413 being connected by the branch wires 421, 422 and 423 to the train wires 224, 225 and 226 and thus to the positive terminal of the battery 235) through wires 426 and 427, contact member 391 of the pneumatic switch device 264, switch member 388 of the device 264, wire 390, electromagnet 271 of the application magnet valve device 248, and subsequently to ground through the wires 451 and 452 as described for the release magnet valve device 249.

The circuit for energizing release magnet valve device 249a extends from the positive terminal of the battery 235 to the contact segment 414 of the controller 194 the same as described for the release magnet valve device 249 and thence through wires 444 and 445, electromagnet 281a of the magnet valve device 249a, wires 451a, 452a and 453a, switch 136 of group 122, wire 491a, switch 135, and wire 454 to ground.

The circuit for energizing the application magnet valve device 248a extends from the positive terminal of the battery 235 to the contact segment 413, as described for the application magnet valve device 248, and thence through wires 426 and 427, contact member 391a of pneumatic switch device 264a, switch member 388a of device 264a, wire 390a, electromagnet 271a of the application magnet valve device 248a, and thence to ground by way of wires 451a and 452a, as described for the release magnet valve device 249a.

Upon the energization of the magnet valve devices 248, 249, 248a and 249a as just described, fluid under pressure is supplied from the main reservoir 221 to the local reservoirs 252 and 252a through the pipe 222 and the branch pipes 275, 275a and the pipes 279, 279a under the control of the respectively associated magnet valve devices in the manner previously described. When the pressure of the fluid in the local reservoirs 252 and 252a as well as in the pipes 279 and 279a reaches a predetermined low value, such as three pounds per square inch, the pneumatic switch devices 251 and 251a are actuated to circuit-closing position for energizing the relays 257 and 257a, respectively. The circuit for energizing the relay 257 extends from the train wire 236, which is connected to the positive terminal of the battery 235 by relay 234 as previously described, through wire 472, switch member 297 of the pneumatic switch device 251, a fixed contact member 494 of the switch device 251, wire 495, electromagnet coil 496 of relay 257 and wire 497 to ground.

The circuit for energizing the relay 257a extends from the train wire 236 through wires 471 and 498, switch member 297a of the pneumatic switch device 251a, fixed contact member 494a of the switch device 251a, wire 495a, coil 496a of the relay 257a, and wire 497a to ground.

The circuits for energizing the eddy current brake coils 62 and 62a of the brake devices 27 and 28 are accordingly established due to the energization of the relays 257 and 257a, respectively. The circuit for the coil 62 of the brake device 27 extends from train wire 233 which it will be remembered is connected to one terminal of the generator 232, through a wire 501, a fixed contact member 502 of the relay 257, movable bridging member 503, contact member 323 of the relay 257, wire 322, rheostat 254, wire 321, and coil 62 of the brake device 27 to ground.

In a similar manner the circuit for energizing the coil 62a for the brake device 28 extends from the train wire 233 through branch wire 501a, fixed contact member 502a of the relay 257a, contact bridging member 503a, fixed contact member 323a of relay 257a, wire 322a, rheostat 254a, wire 321a, and coil 62a to ground.

Application of the eddy current brake of brake devices 27 and 28 to effect retardation of axles 15 and 16, respectively, is accordingly initiated, the exciting current supplied through the coils 62 and 62a of the brake devices 27 and 28 increasing with the decrease in resistance of the rheostat devices 254 and 254a, respectively, occasioned by the increasing pressure of the fluid in the local reservoirs 252 and 252a acting on the diaphragm within the diaphragm devices 255 and 255a.

Assuming for the purposes of the present operation that the braking effect produced on the axles 15 and 16 is substantially equal, the torque forces transmitted, in the manner previously described, from the torque plates 47 of the brake devices 27 and 28 to the followers 89 and 89a of the device 33 (Fig. 1) causes a substantially equal inward movement of the followers 89 and 89a against the resisting force of the torque spring 66, the switch groups 121 and 122 being accordingly both operated to the inner position thereof and the rod 113 being moved to the right with a force corresponding to the braking effect on either of the axles 15 and 16.

As may be ascertained by referring to Fig. 8, the switches 125 and 135 of the switch groups 121 and 122, respectively, are open in the inner position of the switch group and thus the circuits previously traced for energizing the application magnet valve devices 248 and 248a and the release magnet valve devices 249 and 249a are interrupted but the magnet valve devices are maintained energized, notwithstanding the fact that the switches 125 and 135 are opened, due to the simultaneous establishment, through switch groups 121 and 122 of holding circuits in the following manner. The holding circuit for the application magnet valve device 248 and the release magnet valve device 249 is the same as previously described to the point where the wire 491 is connected to the switch member common to the switches 124 and 125, and thereafter the circuit is continued through the switch 124 (now closed), wire 505, branch wire 506, switch 123 of switch group 121, wire 507, switch 133 of switch group 122, branch wire 508 and wire 454 to ground.

Similarly, the application magnet valve device 248a and the release magnet valve device 249a are maintained energized despite the opening of the previously traced circuit at the switch 135, through a holding circuit extending to the point where wire 491a is connected to the switch member common to the switches 134 and 135 as previously described, and thereafter through switch 134 (now closed), wire 505, branch wire 506, switch 123 of switch group 121, wire 507, switch 133 of switch group 122, wire 508, and wire 454 to ground.

It is possible that the switch groups 121 and 122 may not be operated exactly in unison to the inner position thereof, in which case there may be a momentary interruption of energizing current through the electromagnet coils of the magnet valve devices 248, 248a, 249 and 249a but due to electrical and magnetic lag the valves are not shifted measurably from the position they occupy when the magnet valve devices are energized. For all practical purposes, it may therefore be said that when the switch groups 121 and 122 are operated from the central or neutral position thereof to the inner position thereof as just described, the magnet valve devices 248, 248a, 249 and 249a remain energized with a consequent maintenance of the excitation of the eddy current brake coils 62 and 62a of the brake devices 27 and 28 respectively.

As previously stated, movement of the operating rod 113 of the device 33 to the right is effected simultaneously with the operation of the switch groups 121 and 122 to the inner position thereof. The weighing beam 178 of the load measuring device 34 is accordingly rocked on the fulcrum roller 168 in a counterclockwise direction to move the rack rod 186 upwardly against the force of the spring 196 in proportion to the degree of braking effect produced on the axles 15 and 16. It will be understood that the force with which the rack rod 186 is moved upwardly is dependent upon the position of the fulcrum roller 168 which is in turn dependent upon the load acting on the wheel-truck.

The segment drum 193 of the controller 194 is accordingly rotated to a degree determined by the extent of movement of the rack rod 186, the direction of rotation of the segment drum corresponding to an upward movement of the contact segments 413 and 414 relative to the fixed contact members, associated therewith, shown in Fig. 6. As the braking effect on the axles 15 and 16 is increased, due to the increase in the exciting current supplied to the eddy current brake coils 62 and 62a of the brake devices 27 and 28 respectively, the contact segment 413 is moved correspondingly until it disengages all of the fixed contact members 415, 416 and 417, which it will be remembered are connected to the energized train wires 224, 225 and 226.

The circuits previously described, whereby the application magnet valve devices 248 and 248a are energized, are accordingly interrupted and the further supply of fluid under pressure from the main reservoir 221 to the local reservoirs 252 and 252a is thus cut off. There being now no further increase in the pressure of the fluid acting in the diaphragm devices 255 and 255a to cause further reduction in the resistance of the rheostat devices 254 and 254a, further increase in the exciting current of the eddy current brake coils 62 and 62a by means of the rheostats 254 and 254a, respectively, is not effected.

For this condition of the brake equipment the fluid pressure in the pipes 279 and 279a and the local reservoirs 252 and 252a may be of the order of possibly twenty-five to thirty pounds per square inch, it being understood, however, that the pressure in the local reservoir associated with each individual wheel-truck may vary dependent upon the load on the wheel-truck, the local reservoir pressure being higher for the more heavily loaded wheel-truck and lower for the wheel-truck loaded to a lesser extent.

If for any reason, as for example a rise in the supply voltage for the eddy current brake coils 62 and 62a, the braking effect on the axles 15 and 16 is further increased from that described, the corresponding further rotational movement of the segment drum 193 of the controller 194 will cause the contact segment 414 to disengage the fixed contact member associated therewith which is connected to the last energized train wire which contact member, for the degree of braking selected by brake switch 229, and in the operation assumed this happens to be the contact member 433 connected to train wire 226. The circuits for energizing the release magnet valve devices 249 and 249a are thus interrupted and the pressure of the fluid in the local volume reservoirs 252 and 252a relieved by venting of fluid under pressure from the pipes 279 and 279a to atmosphere under the control of the release magnet valve devices 249 and 249a. With such decrease in local reservoir pressure, the pressure with which the piston 324 presses together the carbon blocks 319 of the rheostat devices 254 and 254a is relieved and the resistance of the rheostat devices is accordingly increased to effect a decrease in the exciting current for the eddy current brake coils 62 and 62a. The fluid pressure in the local reservoirs 252 and 252a will be reduced until the braking effect produced on the axles 15 and 16 is lowered sufficiently by the reduction in the exciting current of the eddy current brake coils 62 and 62a that the contact segment 414 is moved back again into contact with the fixed contact member 433, at which time the holding circuits, previously described, for energizing the release magnet valve devices 249 and 249a are again established and further reduction in the fluid pressure in the local reservoirs 252 and 252a is accordingly cut off.

It will thus be seen that the ultimate degree of adhesion utilization or of braking effect effective on all wheels of all wheel-trucks is uniform and is limited to the degree selected by operation of the brake switch 229.

As is well known, the braking effect produced on the axles 15 and 16 by the eddy current brake portion of the brake devices 27 and 28, respectively, while fairly constant over a wide range of speeds will diminish inherently as the speed of rotation of the axle and the motor armature shaft reduces below some relatively low value. Thus the torque forces applied to the followers 89 and 89a of the device 33 through the medium of the torque rods 84 and 84a (see Fig. 1) automatically decrease in value with the result that the torque spring 66 causes outward movement of the follower members 89 and 89a. The roller 111, engaging the head 112 on the actuating rod 113, is thus moved to the left as viewed in Fig. 1, and the spring 196 of the load measuring device 34 accordingly becomes effective to shift the rack rod 186 downwardly to cause reverse rotation of the segment drum 193 of the controller 194 to such an extent that the contact segment 413 reengages the last fixed contact member which is connected to one of the energized train wires 224, 225 and 226, which in the case assumed happens to be the contact member 417, and thus reestablishes a circuit for energizing the application magnet valve devices 248 and 248a.

Fluid under pressure is accordingly again supplied from the main reservoir 221 to the local reservoirs 252 and 252a under the control of the application magnet valve devices 248 and 248a, respectively, to further build up the fluid pressure in the diaphragm devices 255 and 255a to cause further reduction in the resistance of the rheostat devices 254 and 254a and a corresponding increase in the degree of the exciting current for the eddy current brake coils 62 and 62a. As the degree of the braking effect produced on the axles 15 and 16 by the brake devices 27 and 28 correspondingly increases, the segment drum 193 of the controller 194 is again rotated in the manner previously described, until the contact segment 413 disengages the fixed contact members 415, 416 and the contact member 417 connected to the last energized train wire 226, whereupon the circuits for energiing the application magnet valve devices 248 and 248a are again interrupted and further increase in the degree of the exciting current of the eddy current brake coils 62 and 62a cut off.

As the speed of rotation of the axles 15 and 16 is further reduced, the above operation is repeated to increase the degree of exciting current for the eddy current brake coils 62 and 62a until fluid pressure in local reservoirs 252 and 252a attains a predetermined pressure such as forty pounds per square inch when the spring 337 of the pressure limiting devices 256 and 256a is compressed to absorb further increase in pressure acting on the diaphragm devices 255 and 255a and to thereby prevent further increase in the degree of pressure applied to compress the carbon blocks 319 of the rheostat devices 254 and 254a. The rheostat devices 254 and 254a are thus ineffective to further increase the degree of exciting current supplied to the eddy current brake coils 62 and 62a.

With the maximum degree of exciting current supplied to the eddy current brake coils 62 and 62a as just described, further reduction in the speed of rotation of the axles 15 and 16 is accompanied by a consequent reverse movement of the segment drum 193 of the controller 194 to energize the magnet valve devices 248 and 248a, in the manner previously described, and thus cause fluid under pressure to be further supplied to the local reservoirs 252 and 252a so that the pressure therein is increased above the predetermined degree, namely forty pounds per square inch, sufficient to effect operation of the relay valve devices 253 and 253a respectively. Movement of the slide valve of the valve devices 253 and 253a to first lap or cover the exhaust port and subsequently to uncover the inlet port is accordingly effected and fluid under pressure is thus supplied from the local reservoirs 252 and 252a to the pressure cylinders 38 of the brake devices 27 and 28, respectively, application of the friction brake thereof being thus effected.

When the pressure of the fluid in the brake cylinders 38 and thus in the chamber 307 of the valve devices 253 and 253a, added to the tension of spring 313, exceeds the local reservoir pressure, the slide valve 308 is accordingly shifted to lap position, wherein the supply port 314 is covered at the same time as is the exhaust port 315, to hold the pressure in the brake cylinders 38. Since the tension in spring 313 balances substantially forty pounds per square inch of local reservoir pressure, it will be apparent that the pressure in the brake cylinders 38 will always be substantially forty pounds per square inch less in pressure than the pressure in the local reservoirs 252 and 252a.

The friction brake bands 37 of the brake devices 27 and 28 are thus actuated into frictional engagement with the brake drum members 36 of the brake devices to produce a braking effect supplemental to that produced by the eddy current brake of the brake devices 27 and 28.

When the combined braking effect produced by the eddy current brake and the friction brake of the brake devices 27 and 28 produces sufficient movement of the segment drum 193 of the controller 194, the contact segment 413 disengages the fixed contact member 417 which is connected to the last energized train wire 226 and the circuits for energizing the application magnet valve devices 248 and 248a are accordingly interrupted to cut off the further supply of fluid under pressure from main reservoir 221 to the local reservoirs 252 and 252a.

If, upon the application of the friction brake of the brake devices 27 and 28, the total braking effect produced on the axles 15 and 16 is higher than that just described, further rotation of the segment drum 193 occasioned thereby will cause the contact segment 414 to disengage the fixed contact member 433 connected to the last energized train wire 226 and the release magnet valve devices 249 and 249a will accordingly be deenergized to effect relief of the pressure of the fluid in the local reservoirs 252 and 252a. Spring 313 in the relay device 253 accordingly becomes effective to shift the slide valve 308 to the left to uncover the exhaust port 315. Fluid under pressure is accordingly released from the brake cylinders 38 of the brake devices 27 and 28 until the total braking effect produced by the eddy current and friction brakes of the brake devices 27 and 28 for the axles 15 and 16, respectively, is insufficient to maintain the segment drum 193 of the controller 194 in such position that the contact segment 414 disengages the contact member 433. Re-engagement of the contact member 414 of controller 194 with the contact member 433 reestablishes the circuits for energizing the release magnet valve devices 249 and 249a and thus further release of fluid under pressure from the local reservoirs 252 and 252a is cut off. When the pressure in the pressure cylinders 38 of the brake devices 27 and 28 is reduced sufficiently, the fluid pressure acting in the piston chamber of the relay devices 253 and 253a becomes effective to again shift the slide valve to the right to lap or cover the exhaust passage and cut off further reduction in the pressure of the fluid in the pressure cylinders 38. It will thus again be observed that the relay devices 253 and 253a so control the pressure of the fluid supplied to the pressure cylinders 38 that the fluid pressure in the pressure cylinders 38 is always a substantially fixed amount (for example, forty pounds per square inch) less than the pressure of the fluid in the local reservoirs 252 and 252a.

As the speed of the vehicle or train of cars further diminishes and the braking effect of the eddy current brake of the brake devices 27 and 28 on the axles 15 and 16 is accordingly reduced substantially to zero, the controller 194 functions, in the manner previously described, to cause further build up in the fluid pressure of local reservoirs 252 and 252a and the consequent operation of the relay valve devices 253 and 253a to further build up the pressure of the fluid in the pressure cylinders 38 of the brake devices 27 and 28. When the vehicle or train of cars is finally brought to a stop the pressure of the fluid in the pressure cylinders 38 is such as to apply the brake band 37 without sliding the wheels on the axles 15 and 16 and without shock or discomfort to passengers.

It will thus be understood that all the operating mechanisms 31, one for each individual wheel-truck, function simultaneously, in the manner described, to separately regulate the degree of adhesion utilization or of braking effect produced on the axles of each wheel-truck corresponding to axles 15 and 16 shown in Fig. 1, in accordance with the degree selected by the brake switch 229.

Upon the stopping of the vehicle or train of cars, the vibration relay 231 becomes effective to cause energization of the coil 474 of the relay 234 and the connection from the positive terminal of the battery 235 to the train wire 236 established by the relay 234 is thus interrupted. The circuits for energizing the relays 257 and 257a controlling the eddy current brake coils 62 and 62a, respectively, as well as the circuits for energizing the magnet valve devices 208 associated with the load measuring devices 34 are thus interrupted.

Deenergization of the relays 257 and 257a for each wheel-truck accordingly interrupts the circuit connection of the eddy current brake coils 62 and 62a to the train wire 233 and excitation of the eddy current brake coils 62 and 62a is accordingly cut off in order to prevent consumption of power needlessly while the vehicle or train of cars is stopped.

Upon the deenergization of the electromagnet 457 of the magnet valve devices 208, the spring 466 becomes effective to shift the valves 458 and 459 so that fluid under pressure is supplied from the main reservoir pipe 222 to the piston chamber 177 and piston cylinder 141 of the load measuring device 34, through branch pipe 211, chamber 464, past the valve 459, chamber 462, and pipe and passage 212. The bell crank 157 (Fig. 2) is accordingly actuated in a clockwise direction, in the manner previously described, until the roller 161 engages the contact surface 162 on the truck frame. Thus, if the total load on the wheel-truck changes due to load taken on or discharged from the vehicle or car, the position of the fulcrum roller 168 is adjusted, in the manner previously described, so that upon subsequent application of the brakes the degree of braking effect on the axles of the wheel-truck will be in accordance with the load on the wheel-truck.

It will be understood that in the event that the current supply to the eddy current brake coils 62 and 62a fails, for some reason, the pressure in the local reservoirs 252 and 252a will be automatically built up to cause application of the friction brake of the brake devices 27 and 28, the controller 194 functioning as described above to regulate the degree of the braking effect in accordance with the degree selected by operation of the brake switch device 229.

OPERATION (b) *Minor inequality of braking effects on different wheels*

It will be recalled that in the operation of the equipment previously described it was assumed that the braking effect produced on the two axles 15 and 16 was substantially equal at all times. If, however, the braking effect produced on one axle, for example the axle 15, is greater than on the other axle, the degree of difference or unbalance in the braking effect on the axles being greater than the predetermined low amount and less than the predetermined higher amount previously described, then the switch groups 121 and 122 become effective to exercise further control over the brake devices 27 and 28 in the following manner. Since the greater braking effect is assumed to be produced on the axle 15, the torque force urging the rod 84 of the device 33 inwardly will be greater than that urging the rod 84a inwardly and consequently, if the difference in the braking effect on the two axles is between the two predetermined amounts above mentioned, then the follower 89 will remain in the inner position with the switch group 121 correspondingly positioned in its inner position, whereas the follower 89a will be moved to its central or neutral position as shown in Fig. 1 and in which the switch group 122 is correspondingly positioned in its central or neutral position. The circuit for energizing magnet valve devices 248 and 249 with both of the switch groups 121 and 122 in the inner position thereof, it will be recalled, extends in series through the switches 126, 124 and 123 of the switch group 121 as well as through switch 133 of the switch group 122, and thus when the switch group 122 is shifted from its inner position to its central position, as just described, the circuit for energizing the magnet valve devices 248 and 249 is interrupted due to the opening of the switch 133 of the switch group 122. (See Figs. 7 and 8.)

On the other hand, as will be recalled, with switch group 122 in its central position as in Fig. 7, the circuit for energizing the magnet valve devices 248a and 249a extends in series through the switches 136 and 135 of the switch group 122 independently of any of the switches in the switch group 121, and thus the magnet valve devices 248a and 249a are maintained energized.

It will thus be understood that due to the deenergization of the magnet valve devices 248 and 249, pipe 279 leading to the local reservoir 252 is cut off from the main reservoir pipe 222 and connected to atmosphere to relieve the pressure in local reservoir 252, whereas the pipe 279a leading to local reservoir 252a continues to have fluid under pressure supplied thereinto from the main reservoir. The effect of such control is, of course, to decrease the braking effect on the axle having the greater braking effect, namely axle 15, and to increase the braking effect on the axle having the lesser braking effect, namely axle 16.

Upon substantial equalization of the braking effect, on the two axles 15 and 16, the switch group 122 is correspondingly returned to its inner position again and the magnet valve devices 248 and 249 are thus again energized to cause further increase in the braking effect on axle 15 simultaneously with the increase of braking effect on the axle 16.

It will be apparent that the above described operation takes place at any time during an application of the brakes, that is, while the exciting current for the eddy current brake coils 62 and 62a is increasing, or while both the eddy current brake and the friction brake function together. It will also be apparent that should the braking effect produced on axle 16 be greater than that produced on axle 15, the braking effect on axle 16 will be reduced whereas the braking effect on axle 15 will increase automatically.

OPERATION (c) *Major inequality in braking effect on different wheels*

If during an application of the brakes, for some reason, such as wheel and rail condition, the braking force applied to the axles 15 and 16 causes the wheels on one axle, for example axle 16, to start to slide, whereas the wheels on axle 15 continue to roll, obviously, the torque force transmitted from the brake device 28 to the rod 84a will be greatly diminished relative to that transmitted from brake device 27 to the rod 84, and consequently, due to the large or major difference in the degree of torque forces acting on the opposite ends of torque spring 66 of the device 33, the spring 102a will be compressed and the follower 89a moved to its extreme outward position to actuate the switch group 122 to its outer position, the switch group 121 being maintained in its inner position. The circuit for energizing the magnet valve devices 248a and 249a is thus interrupted by the opening of switch 136 in switch group 122 (see "outer" position of switch 136 shown in the chart of Fig. 8) and fluid under pressure is accordingly immediately released from local reservoir 252a through the pipe 279a to reduce the braking force applied to the axle 16.

Switch 137 of the switch group 122 is closed in the outer position of the switch group 122 (see Fig. 8) and completes a circuit for energizing the magnet valve device 265a and a circuit for signal lamp 511. The circuit for energizing the magnet valve device 265a extends from the contact segment 414 of the controller 194, which contact segment it will be understood is connected to the positive terminal of the battery 235 in the manner previously described during the application of the brakes, through wires 444, 445 and 512, switch 137, wires 513 and 514, electromagnet 348a of the magnet valve device 265a and wires 516 and 517 to ground. The circuit for the signal lamp 511 is the same as for the magnet valve device 265a to the wire 514 leading to the magnet valve device 265a, thereafter extending through a rectifier device 519, which permits flow of current therethrough only in one direction as indicated by the arrow head, wires 520 and 521 to the train wire 522 which leads to one terminal of the signal lamp 511, the other terminal of the signal lamp being connected to ground. The signal lamp 511 is thus illuminated to indicate the wheel-sliding condition of the axle 16 on the wheel-truck.

Upon energization of the electromagnet 348a of the magnet valve device 265a, fluid is supplied under the control of the magnet valve device 265a from the main reservoir pipe 222 into the pipe 361a, pneumatic switch device 259a being thereupon immediately actuated to circuit-closing position to connect the common return wire 452 of the magnet valve devices 248 and 249 to ground, the switch member 343a of the switch device 259a connecting the wire 452 to a fixed contact member 500a of the switch device 259a, which contact member 500a is connected to ground by the wire 517. Thus deenergization of the magnet valve devices 248 and 249, which would otherwise be effected due to the interruption of the energizing circuit therefor by the opening of the switch 133 of the switch group 122 (see Fig. 8) upon shifting thereof to the outer position as previously described, is not permitted to take place because of the completion of the holding circuit by operation of the pneumatic switch device 259a. It will be understood that the pneumatic switch device 259a is operated to circuit-closing position a negligibly short time after the switch 137 of the switch group 122 closes and, therefore, that the holding circuit is established for the magnet valve devices 248 and 249 at substantially the same time that the original energizing circuit is interrupted by opening of the switch 133.

It will thus be understood that the application of the brakes is continued on the axle 15, whereas the application of the brakes on the axle 16 whereon the wheels were attempting to slide is relieved.

Upon the elapse of a predetermined interval of time, such as thirty to sixty seconds, after the operation of the pneumatic switch device 259a to circuit-closing position, the time interval being determined according to the time required to build-up sufficient pressure in the timing reservoir 261a under the control of the choke 382a, the relay valve device 262a is operated to supply fluid under pressure from the reservoir 263a into the pipe 378a, whereupon the pneumatic switch device 264a is actuated to move the switch member 387a thereof to circuit-closing position and the switch member 388a into engagement with the upper contact member 394a.

When in circuit-closing position, the switch member 387a of the switch device 264a connects the return wire 452a, for the magnet valve devices 248a and 249a, to ground through the wire 453a, a branch wire 524, switch member 387a, fixed contact member 525a and wires 516 and 517. The switch member 388a of the switch device 264a being connected to the application wire 390a, leading to the application magnet valve device 248a, completes the circuit for energizing the application magnet valve device 248a when in engagement with the contact member 394a, since the contact member 394a is connected to the contact segment 414 of the controller 194 by a wire 526 which is connected to the wire 512 which is in turn connected by the wires 445 and 444 to the contact segment 414.

It will thus be seen that when the pneumatic switch device 264a is actuated by the pressure of the fluid supplied from reservoir 263a under the control of valve device 262a, both magnet valve devices 248a and 249a are again energized and fluid under pressure is again supplied into the pipe 279a and local reservoir 252a from the pipe 222 to effect a reapplication of the braking means of the brake device 28.

Upon the elapse of a predetermined time sufficient to enable the local reservoir 252a to be charged to a pressure of about twenty-five pounds per square inch, as determined by the time required for the fixed quantity of fluid under pressure in the reservoir 263a to be vented to atmosphere through the choke passage 379a in the pipe 378a, the pneumatic switch device 264a is again returned to the position shown in Fig. 7.

When the pneumatic switch device 264a is returned to the position shown in Fig. 7 in the manner just described, the magnet valve devices 248a and 249a are permanently deenergized to effect complete release of the brake device 28 unless wheel and rail conditions have changed so that the braking effect produced by the brake device 28 during the time the pneumatic switch device 264a was actuated out of the position shown in Fig. 7 is sufficient to have caused the return of the switch group 122 at least to the central position thereof. In the event that the switch group 122 has been returned to the central position thereof the equipment thereafter functions as previously described when a minor or small difference in the braking effect on the two axles 15 and 16 occurs.

It will be understood that, in a similar manner, should the wheels on the axle 15 start to slide while the wheels on the axle 16 continue to roll, reduction in the pressure of the local reservoir 252 for a predetermined time followed by recharging of the local reservoir 252 for a predetermined time will be automatically effected to relieve and re-apply the brake device 27 associated with the axle 15, whereas the brake device 28 associated with the axle 16 will continue under the control of the controller 194. It will be noted that closing of the switch 127 of the switch group 121 closes a circuit for energizing the magnet valve device 265 and a circuit for energizing the signal lamp 511. One contact member of the switch 127 is connected by a wire 528 to the wire 445 which is in turn connected by wire 444 to the contact segment 414 of the controller 194, which segment is connected to the positive terminal of the battery 235 in the manner previously described, and the other contact member of the switch 127 is connected by a wire 529 and a rectifier 530, corresponding to the rectifier 519, to the wire 520, which is in turn connected by the wire 521 to the train wire 522 leading to the signal lamp 511.

The rectifiers 530 and 519 are provided for preventing energization of the magnet valve device 265 by closing of the switch 137 of the switch group 122, and for preventing energization of the magnet valve device 265a by the closing of the switch 127 of the switch group 121. It will be apparent that the electromagnets of the magnet valve devices 265 and 265a are connected in parallel relation from the train wire 522 and wire 521 to ground and unless simultaneous flow of current through both magnet valve devices 265 and 265a were prevented, holding circuits for the application and release magnet valve devices for both axles would be simultaneously completed upon the closing of either switch 127 or 137 and thus the brakes on the axle having the sliding wheels would not be released.

Emergency operation

If it is desired to effect a full service or emergency application of the brakes, the brake switch 229 is manually operated to connect all of the train wires 224, 225, 226, 227 and 228 to the positive terminal of the battery 235, the degree of braking effect on all the wheels thus being proportionately higher due to the greater rotational movement of the segment drum 193 of the controller 194 required in order to interrupt the energizing circuits for the magnet valve devices 248, 248a, 249 and 249a, and the resulting longer time which the application magnet valve devices 248 and 248a are energized to supply fluid under pressure to the local reservoirs 252 and 252a. It should be understood that the degree of braking effect produced in emergency applications of the brakes is that produced by a degree of adhesion utilization less than the maximum degree of adhesion utilization possible for normal wheel and rail conditions and that therefore no sliding of any of the wheels will occur.

An emergency application of the brakes may also be initiated independently of the condition of the brake switch 229, that is, even though it is in release position, upon the opening of the energizing circuit for the emergency relay 238 by opening of the "deadman" switch device 239, or by opening of any one of the conductor's switch devices 241 on any of the cars of the train. With the "deadman" switch device 239 and all the conductor's switch devices 241 closed, the coil 242 of the relay 238 is energized and the relay 238 accordingly picked up, the coil 242 being energized through a circuit extending from the positive terminal of the battery 235 through wires 411, 410, 409, 531, coil 242 of relay 238 and, through the "deadman" switch device 239 and the conductor's switch devices 241 connected in series relation in the train wire 243, and thus to ground at the rear car of the train. When the coil 242 of the emergency relay 238 is deenergized by opening of the "deadman" switch 239 or by opening of any one of the conductor's switch devices 241, the switch members 532 and 533 of the relay 238 are actuated to connect both of the train wires 227 and 228 to the positive terminal of the battery 235, whereupon the brake equipment functions in a manner as if the brake switch device 229 had been operated to energize all of the train wires 224 to 228 inclusive. Instead of energizing both of the wires 227 and 228, the train wire 228 alone might be energized. However, in such case, an emergency application of the brakes could not be obtained should the single train wire 228 be severed or broken. I therefore prefer to effect energization of at least one other train wire, such as the train wire 227, in addition to the train wire 228, in order to minimize the possibility of failure to secure emergency applications.

Modifications shown in Figs. 9 and 10

Instead of interrupting the excitation of the eddy current brake coils 62 and 62a for the brake devices 27 and 28, respectively, upon the stopping of the vehicle or train or cars by means of the vibration relay 231 and the relay device 234 controlled thereby, in the manner previously described for the embodiment shown in Figs. 6 and 7, a modified arrangement for cutting off the excitation of the eddy current brake coils 62 and 62a may be provided, as indicated fragmentarily in Fig. 9. In the modification shown in Fig. 9, the connection between the train wire 236 and the switch member 297 of the pneumatic switch device 251 by wire 472 as in Fig. 6 is omitted and the energizing circuit for the coil 496 of eddy current brake relay 257 is established through an additional pneumatic switch device 541 not provided in the embodiment shown in Fig. 6. The pneumatic switch device 541 is similar to the pneumatic switch device 251 and comprises a casing 542 containing a piston 543 having a stem 544 for actuating a switch member 545. Contained within the casing 542 is a biasing spring 546 which acts against one face of the piston 543 to urge it normally into a position such that the switch member 545 is in circuit-closing position, in which the positive terminal of a battery 547, which has its negative terminal grounded, is connected to the switch member 297 of pneumatic switch device 251. At the opposite face of the piston 543 is a chamber 548 which is open to the pipe 279 by means of a branch pipe 549.

The tension of the spring 546 is such as to maintain the switch member 545 in circuit-closing position until the pressure of the fluid supplied to the chamber 548 from the pipe 279 and existing in local reservoir 252 reaches a maximum degree, such as seventy pounds per square inch, whereupon the switch member 545 is actuated to interrupt the energizing circuit for the relay 257, which in turn drops out and cuts off the excitation of the eddy current brake coil 62.

As previously indicated, the controller 194 associated with the operating mechanism 31 is effective to so control the magnet valve devices 248 and 249, as the braking effect of the eddy current brake of the brake device 27 inherently diminishes due to decrease in speed of the vehicle, as to cause the pressure in the local reservoir 252 to be built up to a maximum degree when the vehicle or train of cars is stopped. Thus, by utilizing the maximum pressure obtained in the pipe 279 and associated local reservoir 252, the circuit for energizing the eddy current brake relay 257 may be interrupted when the vehicle or train of cars is brought to a complete stop.

While the modification over the previously described embodiment is shown in Fig. 9 only in connection with the pipe 279 and the eddy current brake relay 257, it should be understood that a similar modification of the energizing circuit for the eddy current brake relay 257a for the eddy current brake coil 62a of the brake device 28 is also provided. It should also be understood that the pneumatic switch device 541 may act in the place of the relay 234 for controlling energization of train wire 236 whereby the magnet valve devices 208 and eddy current brake relays 257 and 257a are all controlled thereby, as shown in Fig. 10.

*Modifications shown in Figs. 11, 12 and 13*

In Figs. 11, 12 and 13 a modified arrangement is shown for electrically transmitting the braking effect produced on the axles 15 and 16 to the measuring device 33 of the operating mechanism 31. In Fig. 11, the axles 15 and 16 are driven by the motors 561 and 562, respectively, by means of a flexible gear or quill type gear drive mechanism 564 of well known construction, the drive mechanism 564 comprising a gear wheel 565 mounted on the axles 15 or 16 which gear wheel is engaged in driving relation by the driving pinion gear 566 secured to the armature shaft of the motors 561 or 562.

The gear wheel 565 comprises two toothed portions 567 and 568 which are secured together at the rim thereof as by a plurality of rivets 569 or other suitable securing means, the portion 568 having a hub 571 for mounting the gear wheel 565 for rotary movement relative to the axle 15 or 16. The hub 571 is provided with a suitable longitudinal recess 572 at the inner end thereof for receiving the hub 573 of a spider wheel 574 which is keyed or otherwise suitably secured to the shaft 15 or 16 and which is provided with a plurality of radiating spokes 576 corresponding in number to the spokes 577 of the gear wheel 565. The spokes 576 of the spider wheel 574 extend radially outward between the portions 567 and 568 of the gear wheel 565, the outer end of each of the spokes 576 being received in a cooperating slot 579 formed at the inner periphery of the rim of the gear wheel 565. Interposed between each pair of adjacent spokes 577 is a coil spring 581, adjacent the rim of the gear wheel 565, which is secured in position as by lugs 582 extending transversely from the spokes 576 of the spider wheel 574. A flexible or yielding relative movement between the gear wheel 565 and spider wheel 574 is thus effected upon application of power to the gear wheel 565, since each of the springs 581 is compressed between a spoke 576 on the spider wheel 574 and the adjacent spoke 577 of the gear wheel 565. It will thus be apparent that, conversely, when the driving motors 561 or 562 are braked dynamically or by braking means associated with the motor armature shaft, the springs 581 will likewise be compressed due to the relative movement of the spider wheel 574 and the gear wheel 565, the degree of compression of the springs 581 being in proportion to the braking effect produced on the armature shaft of the motors 561 or 562.

I therefore utilize the degree of the compression of one of the springs 581 as a measure of the braking effect produced on the axle 15 or 16 with which the gear wheel 565 is associated. To this end, a rheostat device 584 having a casing 585 of insulating material with an extension 586 provided with a suitable opening through which the lug 582 on one of the spokes 576 of the spider wheel extends, the extension 586 being interposed between one end of the associated coil spring 581 and a spoke 577 of the gear wheel 565.

The rheostat 584 further comprises a resistance element 587 suitably mounted within the casing 585, and a movable contact member 588 cooperatively contacting the resistance element and mounted in insulated relation on an arm 589 extending to the exterior of the casing 585, the arm 589 having a flange provided with a suitable opening through which extends the lug 582 on an adjacent spoke 576 of the spider wheel 574 cooperating with the opposite end of the spring 581, the flange being interposed between the end of the coil spring and the adjacent spoke 577 of the gear wheel.

The movable contact 588 and one end of the resistance element 587 are connected, as by wires or conductors 592 and 593, respectively, to collector rings 594 and 595, respectively, which are mounted in insulated relation on the outer periphery of the hub 571 of the gear wheel 565. A pair of brushes 596 and 597 are provided, which cooperate with the collector rings 594 and 595, respectively, and which are suitably mounted in a manner not shown, the brush 597 being connected to ground as by a wire 598 and the brush 596 being connected, as by a wire 599, to one terminal of a solenoid 601 which is adapted to actuate the torque rod 84m of the measuring device 33.

A solenoid 602 is also provided for actuating the torque rod 84p corresponding to axle 16, which solenoid 602 is similarly connected in series with a rheostat 584 through the collector rings on the hub 571 of the gear wheel 565 associated with the axle 16. Corresponding terminals of the solenoids 601 and 602, opposite to the terminals connected to the collector rings on the hub of the gear wheels 565, are connected by a wire 603, which is in turn connected by wire 604 to the train wire 224 shown in Figs. 6 and 7.

It will be recalled from previous description, that the train wire 224 is connected to the positive terminal of the battery 235 (see Fig. 6) when the brake switch device 229 is operated to a brake application position, and it will therefore be apparent that the solenoids 601 and 602 will not be energized unless the brake switch device 229 is in a brake application position.

For the sake of simplicity, brake devices corresponding to the brake devices 27 and 28 are not specifically illustrated in Fig. 11, but it should be understood that brake devices corresponding thereto are embodied within the casing of the motors 561 and 562 in associative relation to the armature shafts. Since the necessity for providing mounting means corresponding to the torque plate 47 in the brake devices 27 and 28 is obviated in the modification shown in Figs. 11, 12 and 13, it will be understood that the core structure for the eddy current brake coils 62 and 62a as well as the pressure cylinders 38 and the brake band 37 are mounted stationarily on an extension of the casing of the motor 561 and 562.

In operation, when the brake switch device 229 is operated to an application position wherein the train wire 224 is energized, current is supplied to both the solenoids 601 and 602 from the positive terminal of the battery 235 to the train wire 224, in the manner previously described, and thence through wire 604 to the point 605, whence the current divides, one part flowing through wire 603, solenoid 601, wire 599, brush 596, collector ring 594, wire 592, movable contact member 588 of rheostat 584, resistance elements 587, wire 593, collector ring 595, brush 597, and wire 598 to ground, the other part of the current flowing through the solenoid 602 and the rheostat 584 mounted on the gear wheel 565, associated with the axle 16, to ground in a similar manner.

As the braking effect produced on the axles 15 and 16 increases, the degree of compression of the spring 581, with which the rheostat 584 is associated, increases and consequently relative movement of the casing 585 of the rheostat and of the movable contact member 588 occurs, the movement of the contact member 588 being in a direction to decrease the amount of resistance element 587 included respectively in the circuit of the solenoids 601 or 602.

Since the force with which the torque rods 84m and 84p are urged inwardly is in proportion to the exciting current flowing through the associated solenoids 601 and 602, respectively, it will be apparent that the degree of braking effect produced on the axles 15 and 16 is correspondingly reflected in the degree of force with which the solenoids 601 and 602 urge the torque rods 84m and 84p inwardly.

It will be apparent that regardless of which direction the vehicle or train of cars is traveling, that is, regardless of the direction of rotation of gear wheel 565, the amount of the resistance element 587 of the rheostat 584 which is included in the circuit of the solenoid 601 or 602 will always be decreased in proportion to the degree of braking effect produced on the axles, movement of the movable contact member 588 relative to the casing 585 of the rheostat 584 being effected for one direction of rotation of the gear wheel 565 and movement of the casing 585 of the rheostat 584 relative to the movable contact member 588 being effected for the opposite direction of the rotation of the gear wheel 565.

The system shown in Figs. 11, 12 and 13, whereby the braking effect produced on the axles 15 and 16 is measured electrically, is advantageous in that it enables the driving motors 561 and 562 to be cradled for movement about the axles 15 and 16 instead of the axles 15 and 16 being cradled for rotation about the axis of the armature motor shaft as is necessary in the case of the first described embodiment shown in Fig. 1. If the driving motors 561 and 562 are dynamically or regeneratively braked or braked as indicated in Fig. 11, by means of an eddy current brake and friction brake mounted on the casing of the motors 561 and 562, mounting of the casing of the motors 561 or 562 for rotary movement about the axis of the armature shaft thereof would be necessary if the braking effect produced on the axles were transmitted mechanically, as in Fig. 1, to the torque rods of the device 33. Such movable mounting of the motors 561 and 562 would be a cumbersome and difficult task and it will therefore be seen that the difficulties incident to mounting the motor casings for rotary movement about the axis of the armature shafts thereof are avoided by employing the electrical system shown in Figs. 11, 12 and 13 for transmitting the braking effect produced on the axles 15 and 16 to the operating mechanism 31.

Summary

Summarizing, my invention comprises an operating mechanism including a device for measuring the greater of the braking effects produced on two axles of a wheel-truck and for determining the extent of the difference in the braking effect produced on the axles, and a load responsive device which is adjusted in accordance with the load on the wheel-truck.

The driving motor for each of the axles of the wheel-truck has associated therewith a brake device comprising a fluid pressure operated friction brake and an eddy current type of brake typical of various forms of electric brakes, the mounting means for both braking means being moved by the torque acting thereon in accordance with the braking effect produced on the armature shaft of the motor, which is the same as that produced on the axles since the armature shaft of the motor and the axles are connected by cooperating pinion gears and gear-wheels. The degree of rotary movement of the mounting means for the brake device associated with each axle occasioned by the torque exerted thereon is transmitted through a system of levers to opposite ends respectively of a coil spring, termed the torque spring, which is compressively shortened in length in accordance with the degree of the greater of the torque forces acting thereon and which is shifted axially in one direction or the other depending upon which of the torque forces is the greater, the extent of the shift being a measure of the difference in the two torque forces.

The shortening in length of the torque spring is transmitted through a system of levers, adjusted in accordance with the load on the wheel-truck by the load responsive device, to actuate a drum type controller out of a normal position to a degree dependent upon the degree of the greater torque force.

A plurality of train wires extending throughout the length of the train, are adapted to be connected in succession to battery by a manually operable brake switch device on the control car of the train, the number of wires connected depending upon the degree of operative movement of the brake switch device out of release position.

The drum type controller comprises a pair of stepped contact segments insulated from each other and each normally in contact with a different group of fixed contact members which are severally connected to the train wires. One of the fixed contact members of each group remains in engagement with the associated contact segment. The fixed contact member of one group which remains in contact with the contact segment is connected to one terminal of the release magnet valve device for the brake means associated with one axle and the corresponding terminal of the release magnet valve device associated with the brake means for the other axle. The fixed contact member of the other group which remains in contact with its associated contact segment is connected to one terminal of the application magnet valve device for the brake means of one axle and the corresponding terminal of the application magnet valve device for the brake means for the other axle.

A pair of switch groups is provided, each group being operatively associated, respectively, with opposite ends of the torque spring, and comprising a plurality of individual switch members adapted to be simultaneously operated in accordance with the axial position and with the degree of contraction of the torque spring. The switches of each switch group have three operating positions, a neutral or central position in which they are normally positioned when the brakes are released, an inner position to which they are moved when the end of the torque spring with which they are associated is moved inwardly by the torque force applied to that end of the spring, and an outer position to which either one or the other of the switch groups is moved if the torque force applied to the end of the torque spring with which it is associated is more than a predetermined amount less than that applied to the opposite end of the torque spring.

With the switch groups both in the central position thereof, the return circuit for the application and release magnet valve device for the one axle extends in series through two of the individual switches of the one switch group corresponding thereto and the return circuit for the application and release magnet valve devices associated with the other axle is completed in series through two of the individual switch devices of the other switch group.

The application and release magnet valve devices for each axle control the supply and release of fluid under pressure from a main reservoir to a local reservoir for each axle, the exciting current for the eddy current brake coils for each axle being increased by operation of a rheostat controlled in accordance with the pressure in the corresponding local reservoir. A relay device is provided for each axle which is subject to the pressure in the local reservoirs but which is not operated until the pressure in the reservoir exceeds a predetermined pressure, such as forty pounds per square inch, whereupon the relay is operated to supply fluid under pressure to the pressure cylinders for operating the friction brake of the brake devices associated with the motor armature shaft for each axle. These relays are effective to maintain the substantially forty pounds differential between brake cylinder pressure and local reservoir pressure.

A pneumatic switch device for each axle, which is operated to a circuit-closing position when the local reservoir pressure attains a predetermined low value such as three pounds per square inch, causes pick-up of a relay for completing the exciting circuit for the eddy current brake coil of the brake device associated with the corresponding axle.

When one or more of the train wires are connected to battery by operative movement of the brake switch device, the application and release magnet valve devices for each axle are both energized and the eddy current brake coil excitation increased in accordance with the build-up of pressure in the local reservoirs.

As the torque forces transmitted to opposite ends of the torque spring in the torque measuring device increase, the torque spring is contracted or shortened in length and the switch groups are accordingly both actuated to the inner positions, wherein the return circuit for the magnet valve devices for one axle is established through several of the individual switches of the switch group corresponding thereto and one of the individual switches of the other switch group, the original return circuit being interrupted by opening of one of the individual switches.

When the braking effect produced on either of the axles of the wheel-truck and transmitted through the torque responsive device and the load responsive device to the drum controller has effected sufficient movement of one of the stepped contact segments on the controller to disengage all of the fixed contact members connected to energized train wires, the energizing circuit for the application magnet for each axle is accordingly interrupted and the build-up of fluid under pressure in the local reservoirs for each axle is cut-off, no further increase in the excitation of the eddy current brake coils for the brake device of each axle being thereafter effected, except as hereinafter described.

Should the braking effect produced on either of the axles be sufficient to further actuate the drum controller, the other stepped contact segment disnegages all the associated contact members connected to energized train wires, and the circuit for energizing the release magnet valve devices for each axle is interrupted and a decrease in exciting current for the eddy current brake coils effected. The excitation for the eddy current brake coils for each axle rises to a maximum at the time the local reservoir pressure is substantially forty pounds per square inch and thereafter, as the speed of the vehicle or train of cars decreases, the braking effect produced by the eddy current brakes inherently decreases in well known manner. The drum controller is accordingly reversely moved to re-establish the circuits for energizing the application magnet valve devices for both axles to cause further build-up in local reservoir pressure. The relay devices, previously described, are thus operated to supply fluid under pressure to the pressure or brake cylinders for operating the friction brakes associated with each of the axles to produce braking effect on each of the axles supplementary to that produced by the eddy current brake for each axle. The degree of application of the friction brake for each axle is gradually increased with the increase in local reservoir pressure as the braking effect of the eddy current brake diminishes until a maximum application force is attained by the friction brake which however is not sufficient to cause sliding of the wheels on the axles. Regulation of the braking effect or adhesion utilization produced on each axle to a substantially uniform degree, as selected by the brake switch, is thus effected.

In order to cut-off the excitation of the eddy current brake coils and thus prevent needless waste of power, when the vehicle or train is stopped, a vibration relay device is provided which interrupts the circuit of the eddy current brake coil relay to cause it to drop out and interrupt the supply of current to the eddy current brake coil. This vibration relay also controls a magnet valve device associated with the load responsive device, the said magnet valve device being effective to condition the load responsive device for adjustment in accordance with the load on a wheel-truck when the vehicle or train of cars is stopped, and for causing the load responsive device to be locked in position when the vehicle or train of cars is in motion.

If the braking effect produced on one axle is greater than that produced on the other axle by such an amount that the switch group for the axle having the greater braking effect is in its inner position and the switch group for the axle having the lesser braking effect produced thereof is in its central position, the return circuit for the magnet valve devices for the axle having the greater braking effect is interrupted, whereas the return circuit for the magnet valve devices for the axle having the lesser braking effect produced thereon is maintained. The braking effect on the axle which had the greater braking effect produced thereon is thus reduced, whereas the braking effect on the axle which has the lesser braking effect produced thereon continues to be increased. When the braking effect on the two axles are again equalized the switch groups are again both in the inner position thereof wherein the magnet valve devices for both axles are energized to maintain the application of the brakes, subject of course to the control exercised by the drum controller.

In the event that one axle starts to slide while the other continues to roll, during an application of the brakes, the switch group corresponding to the sliding axle is actuated to its outer position, whereas the switch group for the axle which continues to roll is maintained in its inner position. One of the individual switches of the switch group corresponding to the axle which starts to slide is closed in the outer position of the switch group and completes the circuit for energizing a magnet valve device which supplies fluid under pressure from the main reservoir to a pneumatic switch device which establishes a holding circuit for the return wire of the application and release magnet valve devices corresponding to the axle which continues to roll, while another switch of the switch group, corresponding to the axle which starts to slide, opens and interrupts the return circuit for the application and release magnet valve devices corresponding to the axle which starts to slide.

The retarding force exerted on the axle which starts to slide is thus relieved while the retarding force is maintained on the axle which continues to turn.

A timing reservoir, supplied with fluid under pressure through a choke under the control of the magnet valve device which controls the supply of fluid to the pneumatic switch device last mentioned, times the operation of a relay valve device to take place a predetermined interval of time after the pneumatic switch device is operated to establish the holding circuit previously mentioned, the relay valve device being operated to supply fluid under pressure from a local reservoir to another pneumatic switch device which re-establishes the energizing circuit for the application and release magnet valve devices corresponding to the axle which starts to slide. Re-application of the brakes on the axle which starts to slide is thus effected. The fluid supplied to the last mentioned pneumatic switch device is vented to atmosphere through a choke so designed that after a second predetermined interval of time has elapsed, the last mentioned pneumatic switch device will be returned to its normal position, wherein the energizing circuit for the application and release magnet valve devices for the axle which starts to slide is again interrupted unless the switch group corresponding to that axle is in the meantime returned to its central or inner position. If the switch group corresponding to the axle which starts to slide has been returned to its central position the equipment then functions as before described for minor differences in the braking effect produced on the two axles, equalization of the braking effect on the two axles being eventually effected. If the switch group corresponding to the axle which starts to slide remains in its outer position the energizing circuits for the application and release magnet valve devices for the axle which starts to slide is again interrupted and the braking effect on the sliding axle is again relieved.

A signal lamp located on the control car of the train is connected to a train wire which extends throughout the length of the train and the closure of one individual switch of each switch group when the switch group is in outer position, causes battery to be connected to the train wire and illumination of the signal lamp effected to indicate the wheel-sliding condition.

Full service or emergency application of the brakes may be effected by manual operation of the brake switch device to the fullest extent out of the release position whereby all of the train wires associated with the brake switch device are energized, thus requiring greater movement of the drum controller operated through the torque responsive and load responsive mechanisms before cutting off further increase in the degree of the brake application.

Emergency applications of the brakes may be effected independently of the position of the brake switch device by means of an emergency relay controlled by a "deadman" switch on the control car of the train and conductor's switches connected in series relation and located one on each car of the train. The emergency relay is normally energized and when deenergized by opening of the "deadman" switch or any one of the conductor's switches, the relay drops out and establishes a connection for energizing the last two train wires associated with the brake switch device, whereupon the application of the brakes is automatically effected in the manner previously described.

In Figure 9 a modified arrangement is provided for cutting off the excitation of the eddy current brake coils when the vehicle or train of cars comes to a stop. In this modification the energizing circuit for the eddy current brake coil relay is normally completed through a pneumatic switch device which is normally maintained in circuit-closing position and which is actuated to circuit-opening position when the pressure in the local reservoir, previously mentioned, for each axle attains a maximum value, such as seventy pounds per square inch, which value is not attained until the braking effect of the eddy current brake associated with the axles has been reduced substantially to zero by the stopping of the vehicle or train of cars.

In Figure 10 another modified arrangement is shown wherein the pneumatic switch device employed in the modification of Figure 9 serves to interrupt the energization of the train wire from which the eddy current brake relay and the magnet device controlling the load measuring device are energized as in Figs. 6 and 7, the pneumatic switch device being thus effective to control both the eddy current brake and the load measuring device.

In Figs. 11, 12 and 13, a modified arrangement whereby the braking effect produced on each axle is electrically transmitted to the operating mechanism for the drum controller is illustrated. Essentially the modification comprises a flexible or quill type gear wheel constituting a part of the driving mechanism between the driving motor and the axle, in which a spider wheel keyed to the axle and having a plurality of spokes radiating from the hub thereof is associated with the gear wheel in such manner, by means of the coil springs interposed between successive spokes on the gear wheel, that when braking force is applied to the gear wheel, one of the spokes of the spider wheel at opposite ends of one of the coil springs acts to compress the coil spring in accordance with the degree of braking effect produced on the gear wheel.

A rheostat which is adjusted in accordance with the degree of compression or shortening of the coil springs between the spokes of the gear wheel and which is connected in the circuit of solenoids actuating the torque rods of the torque responsive mechanism by means of collector rings on the hub of the gear wheel is effective to increase the current in the solenoids to increase the force with which the torque rods are applied to opposite ends of the torque spring in the torque responsive device in accordance with the degree of the braking effect produced on the axle.

The circuit for energizing the solenoids associated with the torque rods of the torque responsive device is not completed unless the brake switch device is in an application position, thus preventing consumption of power by the solenoids except during an application of the brakes.

It will be apparent, therefore, that I have provided a brake controlling system for producing a substantially uniform degree of braking effect or degree of adhesion utilization on all the wheels of the vehicle or train of cars whereby the possibility of sliding of the wheels due to non-uniformity in the degree of braking on the various wheels of the train of cars is obviated. It will also be apparent that I have provided a brake controlling system which acts automatically to equalize the braking effect produced on the several axles of an individual wheel-truck in the event that the braking effect produced on the several axles differs by a small amount while both axles continue to turn.

It will also be apparent that I have provided a brake controlling system effective when one of the wheels or axles on a wheel-truck starts to slide while another continues to roll, to maintain the application of the brakes on the axle which continues to roll and to automatically relieve the retarding force applied to the axle which starts to slide for a predetermined interval of time and then automatically effecting the reapplication, for a predetermined time of the retarding force to the axle which had started to slide.

It will, in addition, be seen that I have provided a brake control system for preselecting different degrees of adhesion utilization or braking effect and for automatically regulating the degree of adhesion utilization or braking effect produced on each wheel of each wheel-truck individually to the degree selected.

It will also be seen that I have provided means on one car of a train for signaling the occurrence of a wheel-sliding condition on any of the wheel-trucks of the vehicle or train and that I have also provided novel means whereby the excitation of an eddy current brake coil, illustrative of any type of electric brake, may be cut off when the vehicle or train of cars comes to a stop.

While I have illustrated and described only several embodiments of my invention, it will be apparent that various changes, omissions or additions may be made therein without departing from the spirit thereof. It is, therefore, not my intention to limit the scope of my invention except as necessitated by the prior art and defined in the appended claims.

Having now described my invention, what I claim as new and desire to secure by Letters Patent, is:

1. In a vehicle brake system, in combination, brake means for producing a braking effect on a vehicle wheel, control means operative to effect application and release of said brake means, means actuated responsively according to the torque exerted on the brake means upon application thereof, means conditioned responsively according to the load supported by the wheel, and means operated out of its normal position by the torque responsive means to different degrees, for a given torque exerted on the brake means, dependent upon the condition of the load conditioned means, for effecting operation of the control means to control the degree of braking effect produced by the brake means.

2. In a vehicle brake system, brake means for producing a braking effect on a vehicle wheel, control means operative to cause application of said brake means, control means operative to cause the release of said brake means, and means actuated responsive to the torque exerted on the brake means when the brake means is producing a braking effect and controlled according to the load carried by the vehicle wheel for effecting such operation of said application control means and said release control means as to regulate the degree of braking effect produced by the brake means to a substantially uniform degree.

3. In a vehicle brake system, brake means for producing a braking effect on a vehicle wheel, control means operative to cause application and release of said brake means, means actuated to different degrees out of a normal position responsive to the torque exerted on the brake means when the brake means is producing a braking effect for effecting such operation of the control means as to regulate the braking effect produced by the brake means to a substantially uniform degree, and means conditioned according to the load carried by the wheel and effective to so vary the degree of response of said last means to a given torque that the same uniform degree of braking effect is produced by the brake means for different loads carried by the wheel.

4. In a vehicle brake system, brake means for producing a braking effect on a vehicle wheel, electrically operated means operative to cause application and release of said brake means, switch means actuated to different degrees out of a normal position responsive to the torque exerted on the brake means when the brake means is producing a braking effect for so controlling the electrically operated means as to regulate the braking effect produced by the brake means to a substantially uniform degree, and means conditioned according to the load carried by the wheel for so varying the degree of response of said switch means to a given torque exerted on the brake means that said electrically operated means is effective to so control the brake means as to cause it to produce the same uniform degree of braking effect for different loads carried by the wheel.

5. In a vehicle brake system, in combination, brake means for producing a braking effect on a vehicle wheel, valve means for effecting application and release of said brake means, means actuated according to the torque exerted on the brake means upon application thereof, means conditioned according to the load supported by the wheel, means controlled jointly by both said last two means for effecting operation of the valve means to control the degree of braking effect produced by the brake means, and means responsive to lack of motion of the vehicle for so controlling the load conditioned means as to cause it to be conditioned responsive to variations in the load supported by the wheel only when the vehicle is stopped.

6. In a vehicle brake system, brake means for producing a braking effect on the vehicle, means operative to control the brake means including means conditioned responsively according to the load carried by the vehicle, and means operative by the vibration of the vehicle, when in motion, to render the load responsive means unresponsive to changes in load on the vehicle and operative upon lack of vibration of the vehicle when the vehicle is stopped for rendering the said load responsive means responsive to changes in the load carried by the vehicle.

7. In a brake system, in combination, a rotary element, brake means for producing a brake effect on said rotary element, means mounting said brake means for rotary movement in opposite directions about the axis of the rotary element, resilient means yieldingly opposing rotary movement of the mounting means in the direction of rotation of the rotary element caused by the torque exerted on the mounting means upon an application of the brake means, means effective upon rotary movement of the said mounting means in one direction or in the opposite direction to cause application of the torque force exerted on the mounting means to the said resilient means in the same direction, and means controlled according to the effect produced by the torque force on the resilient means for controlling the brake means.

8. In a vehicle brake system, brake means effective upon application thereof to produce a braking effect on a vehicle wheel, means operative to control application and release of the brake means and to select any one of a plurality of degrees of braking effect, and means operatively responsive to the torque exerted on the brake means upon application thereof for so controlling the brake means as to regulate the braking effect produced by the brake means to that degree selected.

9. In a vehicle brake system, brake means effective upon application thereof to produce a braking effect on a vehicle wheel, means operative to control application and release of the brake means and to select any one of a plurality of degrees of braking effect, and means operatively responsive to the torque exerted on the brake means upon application thereof and controlled according to the load supported by the wheel for so controlling the brake means as to regulate the braking effect produced by the brake means to that degree selected notwithstanding that the wheel may support different loads at different times.

10. In a vehicle brake system, brake means effective upon application thereof to produce a braking effect on a vehicle wheel, means operative to control application and release of the brake means and to select any one of a plurality of degrees of braking effect, means operatively responsive to the torque exerted on the brake means upon application thereof for so controlling the brake means as to regulate the braking effect produced by the brake means to that degree selected, and means conditioned according to the load supported by the wheel for varying the degree of operative response of said last means to a given torque exerted on the brake means and thereby causing said last means to so control the brake means as to cause it to produce the selected degree of braking effect notwithstanding that the wheel may support different loads at different times.

11. In a vehicle brake system, brake means effective upon application thereof to produce a braking effect on a vehicle wheel, means operative to cause application of the brake means and to select any one of a plurality of degrees of adhesion utilization, and means controlled by both the braking effect produced by the brake means on the associated wheel and by the load supported by the wheel for so controlling the brake means as to cause it to produce a substantially uniform degree of braking effect corresponding to the selected degree of adhesion utilization.

12. In a vehicle brake system, a brake device, an application magnet device, a release magnet device, said magnet devices being effective to initiate application of the brake device upon simultaneous energization thereof and to cause release of the brake device upon simultaneous deenergization thereof, manually operative means for effecting at one time simultaneous energization and at another time simultaneous deenergization of the magnet devices, and means operatively controlled in accordance with the torque force exerted on the brake device for controlling the energization and deenergization of the magnet devices individually, to regulate the degree of braking effect ultimately produced by the brake device to a substantially uniform degree.

13. In a vehicle brake system, a brake device, an application magnet device, a release magnet device, said magnet devices being effective to initiate application of the brake device upon simultaneous energization thereof and to cause release of the brake device upon simultaneous deenergization thereof, manually operative means for effecting at one time simultaneous energization and at another time simultaneous deenergization of the magnet devices, and means operatively controlled in accordance with the torque force exerted on the brake device for controlling the energization and deenergization of the magnet devices individually, said last means being operative to cause deenergization of the application magnet device and the release magnet device in succession and energization of the release magnet device and the application magnet device in succession, to regulate the degree of braking effect produced by the brake device to a substantially uniform degree.

14. In a train brake system, an application magnet device and a release magnet device adapted upon simultaneous energization to initiate application of the brakes and upon simultaneous deenergization to effect release of the brakes, said magnet devices each operating on a normally open circuit, a plurality of train wires, manually operative means normally in a position to interrupt the circuit for each magnet device and operative to selectively close the circuit through one of the said train wires or in parallel through two or more of said train wires, and circuit-controlling means for each magnet device actuated in accordance with the degree of braking effect produced by the brakes for successively cutting the train wires out of the circuit or successively into the circuit of the corresponding magnet device, said magnet devices being thereby individually controlled to regulate the degree of braking effect produced by the brakes in accordance with the number of train wires included in the circuit thereof.

15. In a brake system for a train of cars, a brake device, an application magnet device and a release magnet device, each of the magnet devices operating on a normally open circuit and effective when simultaneously energized to cause application of the brake device to be initiated and when simultaneously deenergized to cause release of the brake device, a plurality of train wires, means manually operative to selectively close the normally open circuit through one of the train wires or through two or more successive train wires in parallel relation, whereby simultaneous energization of the magnet devices is effected, and circuit-controlling means normally connecting the magnet devices to each of the train wires and operative in accordance with the degree of the torque force exerted on the brake device upon an application thereof, to successively interrupt the connection of the magnet devices to each of the train wires, said circuit-controlling means being effective to open the circuit first for only the application magnet device and then for both the magnet devices, the maximum degree of braking effect produced by the brake device being different depending upon which of the train wires is last included in the circuit of the magnet devices.

16. In a vehicle brake system, in combination, a pair of separate brake means associated respectively with different wheels, means operative to control the application of the brake means, means operative to control the release of the brake means, and means controlled jointly by the torque forces exerted on the separate brake means and operative to control the operation of both the application and the release control means for the brake means.

17. In a vehicle brake system, in combination, a pair of separate brake means associated respectively with different wheels, means operative to control the application of the brake means, means operative to control the release of the brake means, means operated in accordance with the relation of the torque forces exerted on the separate brake means, and means actuated by said last means for controlling the operation of both the application and the release control means for the brake means.

18. In a vehicle brake system, in combination, a pair of separate brake means associated respectively with diffirent wheels, means operative to control the application and release of the brake means, and means controlled in accordance with the greater of the torque forces exerted on the separate brake means and operative to control the operation of the control means for the brake means.

19. In a vehicle brake system, in combination, a pair of separate brake means associated respectively with different wheels, means operative to control the application and release of the brake means, means operably responsive to the greater of the torque forces exerted on the separate brake means, and means controlled by said last means for controlling the operation of the control means for the brake means.

20. In a vehicle brake system, in combination, a pair of separate brake means associated respectively with different wheels, means operative to control the application of the brake means, means operative to control the release of the brake means, means controlled jointly by the torque forces exerted on the separate brake means and operative to control the operation of both the application and the release control means for the brake means, and means effective to vary, in accordance with the load on the vehicle wheels, the effect of given torque forces acting to control said last means.

21. In a vehicle brake system, in combination, a pair of separate brake means associated respectively with different wheels, means operative to control said brake means, means operably responsive to the opposing forces of the torque exerted on the separate brake means, and means controlled by said last means for controlling the operation of the control means for the brake means.

22. In a vehicle brake system, in combination, a pair of separate brake means associated respectively with different wheels, means operative to control said brake means, resilient means yieldingly subject to and conditioned by the opposing forces of the torque exerted on the separate brake means, and means conditioned according to the condition of the said resilient means for controlling the operation of the control means.

23. In a vehicle brake system, in combination, a pair of separate brake means associated respectively with different wheels, means operative to control said brake means, resilient means yieldingly subject to and conditioned by the opposing forces of the torque exerted on the separate brake means, means conditioned according to the condition of the said resilient means for controlling the operation of the control means, and means for causing said last means to be conditioned differently for a given condition of said resilient means depending upon the load carried on the vehicle wheels.

24. In a vehicle brake system, in combination, a pair of separate brake means associated respectively with different wheels, means operative to control the brake means, and means operably responsive to the difference in the torque forces exerted on the separate brake means upon application thereof, to control the operation of the control means for the brake means.

25. In a vehicle brake system, in combination, a pair of separate brake means associated respectively with different wheels, means operative to control the application and release of the brake means, means operably responsive to the difference in the torque forces exerted on the separate brake means upon application thereof, and means operated by said last means for so controlling the operation of the control means for the brake means as to cause the control means to regulate the braking effect produced on the separate wheels to a substantially uniform degree.

26. In combination, a pair of rotary elements, separate brake means associated respectively with each of said rotary elements and movable in accordance with the torque exerted thereon upon application thereof, resilient means yieldingly subject to the opposing torque forces transmitted thereto from said brake means, the degree of yield of said resilient means being in accordance with the greater of the torque forces acting thereon, and means actuated according to the degree of yield of said resilient means for controlling the brake means for both said rotary elements.

27. In combination, a pair of rotary elements, separate brake means associated respectively with each of said rotary elements and movable in accordance with the torque exerted thereon upon application thereof, intervening means subject to the opposing torque forces transmitted thereto from said brake means, resilient means yieldingly resisting shifting of said intervening means when one of the torque forces exceeds the other, the degree of shifting of said intervening means being in accordance with the difference in the torque forces, and means actuated according to the direction in which and degree to which the intervening means is shifted for controlling the brake means for both rotary elements.

28. In combination, a pair of rotary elements, separate brake means associated respectively with each of said rotary elements and movable in accordance with the torque exerted thereon upon application thereof, resilient means yieldingly subject to the opposing torque forces transmitted thereto from said brake means, the degree of yield of said resilient means being in accordance with the greater of the torque forces acting thereon, means actuated according to the degree of yield of said resilient means for controlling the brake means for both said rotary elements, resilient means yieldingly resisting the shifting of said first resilient means in either direction when one of the torque forces exceeds the other, the degree of shifting of said first resilient means being in accordance with the difference in torque forces exerted on the separate brake means and the direction of shift being in the direction of the greater torque force, and means actuated responsive to the direction and degree of shift of said first resilient means for also controlling the brake means.

29. In a vehicle brake system in combination, a pair of separate brake means associated respectively with different wheels, means operative to control one of the said brake means, means operative to control the other of the said brake means, means operably responsive to the difference in the torque forces exerted on the said one brake means and the said other brake means, and means operated by said last means for causing operation of the control means for said one brake means or for said other brake means to effect a reduction in the braking effect produced by the corresponding brake means, that control means being operated which corresponds to the brake means having the greater torque force exerted thereon.

30. In a vehicle brake system, in combination, a pair of separate brake means associated respectively with different wheels, electroresponsive means for controlling one of said brake means, electroresponsive means for controlling the other of said brake means, means operably responsive to the difference in the torque forces exerted on the said one brake means and the said other brake means upon application thereof, and circuit-controlling means for controlling both of said electroresponsive means, said circuit-controlling means being operated by said torque responsive means to cause the electroresponsive means which controls the brake means having the greater torque exerted thereon, to effect reduction in the braking effect produced by that brake means.

31. In a vehicle brake system, in combination, a pair of separate brake means associated respectively with different wheels, means operative to control the brake means, means operably responsive to the difference in the torque forces exerted on the separate brake means upon application thereof, and means operated by said last means and effective when the difference in the torque forces exerted on the separate brake means is less than a predetermined amount to so control the control means for the brake means as to cause it to effect a reduction in the braking effect produced by the brake means having the greater torque exerted thereon and effective when the difference in the torque forces exerted on the separate brake means is greater than said predetermined amount to so control the control means for the brake means as to cause it to effect reduction in the braking effect produced by the brake means having the lesser torque exerted thereon.

32. In a vehicle brake system, in combination, a pair of separate brake means associated respectively with different wheels, means operative to control one of the said brake means, means operative to control the other of the said brake means, means operably responsive to the difference in the torque forces exerted on the said one brake means and the said other brake means, and means operated by said torque responsive means and effective when the difference in the torque forces exerted on the said separate brake means is greater than a predetermined amount for causing operation of the control means for the said one or the said other brake means to effect a reduction in the braking effect caused by the corresponding brake means, that control means being operated which corresponds to the brake means having the lesser torque force exerted thereon.

33. In a vehicle brake system, in combination, a pair of separate brake means associated respectively with different wheels, means operative to control one of the said brake means, means operative to control the other of the said brake means, means operably responsive to the difference in the torque forces exerted on the said one brake means and the said other brake means, means operated by said torque responsive means and effective when the difference in the torque forces exerted on the said separate brake means is greater than a predetermined amount for causing operation of the control means for the said one or the said other brake means to effect a reduction in the braking effect caused by the corresponding brake means, that control means being operated which corresponds to the brake means having the lesser torque force exerted thereon, and means effective after the elapse of a predetermined time following the operation of said last means for rendering the control means, previously operated to effect reduction in the braking effect of the corresponding brake means, effective to cause an increase in the braking effect produced by the corresponding brake means.

34. In a vehicle brake system, in combination, a pair of separate brake means associated respectively with different wheels, means operative to control one of the said brake means, means operative to control the other of the said brake means, means operably responsive to the difference in the torque forces exerted on the said one brake means and the said other brake means, means operated by said torque responsive means and effective when the difference in the torque forces exerted on the said separate brake means is greater than a predetermined amount for causing operation of the control means for the said one or the said other brake means to effect a reduction in the braking effect caused by the corresponding brake means, that control means being operated which corresponds to the brake means having the lesser torque force exerted thereon, and means effective after the elapse of a predetermined time following the operation of said last means for rendering the control means, previously operated to effect reduction in the braking effect of the corresponding brake means, effective to cause an increase in the braking effect produced by the corresponding brake means for not more than a second predetermined interval of time.

35. In a vehicle brake system, the combination with a pair of axles and separate brake means associated respectively with said axles, an application and a release magnet device for controlling one of the brake means, an application and a release magnet device for controlling the other of the brake means, the application and release magnet devices for each brake means being adapted when simultaneously energized to effect application of the brake means and when simultaneously deenergized to effect release of the brake means, means operative to establish circuits for effecting simultaneous energization of the application and release magnet devices for each of the brake means, circuit-controlling means conditioned according to the difference in the braking effect produced by the two braking means, for interrupting the circuits established by said last means when one of the brake means produces a braking effect more than a predetermined amount less than that produced by the other brake means, and a magnet device for each brake means, controlled by said circuit-controlling means, one of the magnet devices corresponding to the brake means producing the lesser braking effect being selectively operated when the circuit-controlling means interrupts the circuits, to cause other circuits to be established for maintaining energized the application and release magnet devices controlling the brake means producing the greater braking effect.

36. In a vehicle brake system, the combination with a pair of axles and separate brake means associated respectively with said axles, an application and a release magnet device for controlling one of the brake means, an application and a release magnet device for controlling the other of the brake means, the application and release magnet devices for each brake means being adapted when simultaneously energized to effect application of the brake means and when simultaneously deenergized to effect release of the brake means, means operative to establish circuits for effecting simultaneous energization of the application and release magnet devices for each of the brake means, circuit-controlling means conditioned according to the difference in the braking effect produced by the two brake means, for interrupting the circuits established by said last means when one of the brake means produces a braking effect more than a predetermined amount less than that produced by the other brake means, a magnet device for each brake means, controlled by said circuit-controlling means, one of the magnet devices corresponding to the brake means producing the lesser braking effect being selectively operated when the circuit-controlling means interrupts the circuits, to cause other circuits to be established for maintaining energized the application and release magnet devices controlling the brake means producing the greater braking effect, a switch device for each of the brake means, each switch device being operative to establish other circuits for effecting energization of the corresponding application and release magnet device, and a relay device for each of said magnet devices controlled by the corresponding magnet device and operative, a predetermined time after the controlling magnet device is operated, for effecting operation of a corresponding one of the said switch devices.

37. In a vehicle brake system, the combination with a pair of axles and separate brake means associated respectively with said axles, an application and a release magnet device for controlling one of the brake means, an application and a release magnet device for controlling the other of the brake means, the application and release magnet devices for each brake means being adapted when simultaneously energized to effect application of the brake means and when simultaneously deenergized to effect release of the brake means, means operative to establish circuits for effecting simultaneous energization of the application and release magnet devices for each of the brake means, circuit-controlling means conditioned according to the difference in the braking effect produced by the two brake means, for interrupting the circuits established by said last means when one of the brake means produces a braking effect more than a predetermined amount less than that produced by the other brake means, a magnet device for each brake means, controlled by said circuit-controlling means, one of the magnet devices corresponding to the brake means producing the lesser braking effect being selectively operated when the circuit-controlling means interrupts the circuits, to cause other circuits to be established for maintaining energized the application and release magnet devices controlling the brake means producing the greater braking effect, a switch device for each of the brake means, each switch device being operative to establish other circuits for effecting energization of the corresponding application and release magnet device, a relay device for each of said magnet devices controlled by the corresponding magnet device and operative, a predetermined time after the controlling magnet device is operated, for effecting operation of a corresponding one of the said switch devices, and means effective to cause each of the said switch devices to interrupt the circuits established thereby upon the elapse of a predetermined time after the circuits are established thereby.

38. In a vehicle brake system, an electric brake device effective to produce a braking effect on a vehicle wheel variable upon variations in the speed of the vehicle and upon variations in the degree of excitation thereof, and means operatively responsive to the torque exerted on the brake device when said brake device produces a braking effect on the wheel for so controlling the excitation of the brake device as to cause it to produce a substantially uniform degree of braking effect on the wheel as the speed of the vehicle varies.

39. In a vehicle brake system, an electric brake device effective to produce a braking effect on a vehicle wheel variable upon variations in the speed of the vehicle and upon variations in the degree of excitation thereof, means operative to control the degree of excitation of the brake device, and means operatively responsive to the torque exerted on the brake device when said brake device produces a braking effect on the wheel for effecting such operation of the excitation control means as to cause the brake device to produce a substantially uniform degree of braking effect on the wheel as the speed of the vehicle varies.

40. In a vehicle brake system, an electric brake device effective to produce a braking effect on a vehicle wheel variable upon variations in the speed of the vehicle and upon variations in the degree of excitation thereof, means operative to control the degree of excitation of the brake device, and means operatively responsive to the torque exerted on the brake device when said brake device produces a braking effect on the wheel for effecting such operation of the excitation control means as to increase the excitation of the brake device according to the diminution in braking effect resulting from reduction in vehicle speed and thereby cause the brake device to produce a substantially uniform degree of braking effect on the wheel as the speed of the vehicle varies.

41. In a vehicle brake system, an electric brake device effective to produce a braking effect on a vehicle wheel variable upon variations in the speed of the vehicle and upon variations in the degree of excitation thereof, means manually operative to effect excitation of the brake device, means operative to control the degree of excitation of the brake device, and means operatively responsive to the torque exerted on the brake device when the brake device produces a braking effect on the wheel for effecting such operation of the excitation control means as to cause the brake device to produce a substantially uniform degree of braking effect on the wheel as the speed of the vehicle varies.

42. In a vehicle brake system, an electric brake device effective to produce a braking effect on a vehicle wheel variable upon variations in the speed of the vehicle and upon variations in the degree of excitation thereof, means operative to effect initial excitation of the brake device, fluid pressure operated rheostat means operative upon an increase in the pressure of fluid supplied thereto to increase the excitation of the brake device, means operatively controlling the supply of fluid under pressure to and the release of fluid under pressure from the rheostat means, and means conditioned according to the torque exerted on the brake device when the brake device produces a braking effect on the wheel for so controlling said last means as to cause the pressure of the fluid supplied to operate the rheostat means to be so increased as the braking effect produced by the brake device on the wheel tends to decrease that the said brake device produces a substantially uniform degree of braking effect on the wheel.

43. In a vehicle brake system, an electric brake device effective to produce a braking effect on the vehicle, a circuit for supplying exciting current to said electric brake device, said electric brake device being effective to produce a braking effect variable with the voltage impressed on said circuit, rheostat means operative to control the voltage impressed on said electric brake device from said circuit, and means operative according to the torque exerted on the brake device when the brake device produces a braking effect for automatically effecting operation of the rheostat means to control the voltage impressed on the electric brake device.

44. In a vehicle brake system, in combination, a pair of separate brake means associated respectively with different vehicle wheels, means operatively responsive to the difference in the braking effects produced by the separate brake means on the corresponding wheels, and signal means controlled by said last means and operative when the difference in the braking effects produced by the separate brake means is greater than a predetermined amount.

45. In a vehicle brake system, in combination, a pair of separate brake means associated respectively with different vehicle wheels, means subject to the torque forces exerted on the separate brake means, the torque forces being exerted on said means in opposing relation, said means being moved responsive to the amount of the difference in the torque forces exerted on the separate brake means, and signal means controlled by said last means and operative upon the occurrence of a predetermined difference in the torque forces acting on the brake means.

46. In a vehicle brake system, in combination, a pair of separate brake means associated respectively with different vehicle wheels and adapted to be yieldingly moved, upon application thereof, in accordance with the torque force exerted thereon, means controlled jointly by torque movement of both said brake means and actuated in accordance with the amount of difference in the torque forces exerted on the separate brake means, and signal means controlled by said last means and operated when the difference in the torque forces acting on the separate brake means exceeds a predetermined amount.

47. In a train brake system, wheel brake means, means manually operative from a normal release position to initiate application of the brake means, said manually operative means being operative from the normal position to a plurality of different positions to select different degrees of braking effect, means operatively responsive to the torque exerted on the brake means, upon application of the brake means, to measure the braking effect produced on the wheel by the brake means and effective to so control the brake means as to regulate the degree of braking effect produced by the brake means to that selected, and manually operative means adapted, independently of the said first manually operative means, to initiate application of the brake means and to select one predetermined degree of braking effect.

48. In a brake system for a train of cars, a brake device, an application magnet device and a release magnet device, each of the magnet devices operating on a normally open circuit and effective when simultaneosuly energized to cause application of the brake device to be initiated and when simultaneously deenergized to cause release of the brake device, a plurality of train wires, means manually operative to selectively close the normally open circuit through one of the train wires or through two or more successive train wires in parallel relation, whereby simultaneous energization of the magnet devices is effected, circuit-controlling means normally connecting the magnet devices to each of the train wires and operative in accordance with the degree of the torque force exerted on the brake device upon an application thereof, to successively interrupt the connection of the magnet devices to each of the train wires, said circuit-controlling means being effective to open the circuit first for only the application magnet device and then for both the magnet devices, the maximum degree of braking effect produced by the brake device being different depending upon which of the train wires is last included in the circuit of the magnet devices, and manually operative means adapted, independently of the first said manually operative means, to close the circuit of said magnet devices through at least one predetermined train wire, whereby a predetermined degree of braking effect is produced by the brake device.

49. In a vehicle brake system, an electric brake device, means operative to effect excitation of the electric brake device, fluid pressure operated rheostat means operative upon an increase in the pressure of fluid supplied thereto to increase the excitation of the electric brake device, means effective to prevent operation of said rheostat means to further increase the excitation of the electric brake device when the pressure of fluid supplied to the rheostat means exceeds a predetermined pressure, and fluid pressure operated means subject to the pressure of fluid supplied to operate the rheostat means and operative when the pressure of the fluid exceeds a second predetermined pressure higher than the first predetermined pressure for effecting interruption of the excitation of the electric brake device.

50. In a vehicle brake system, an electric brake device effective to produce a braking effect on the vehicle variable upon variations in the speed of the vehicle and upon variations in the degree of excitation thereof, means operative to effect initial excitation of the brake device, fluid pressure operated rheostat means operative upon an increase in the pressure of fluid supplied thereto to increase the excitation of the brake device, means operatively controlling the supply of fluid under pressure to and the release of fluid under pressure from the rheostat means, means conditioned according to the braking effect produced by the brake device for so controlling said last means as to cause the pressure of the fluid supplied to operate the rheostat means to be so increased as the braking effect produced by the brake device tends to decrease that the said brake device produces a substantially uniform degree of braking effect, and fluid pressure operated means subject to the pressure of fluid supplied to operate the rheostat and operative when the pressure of the fluid exceeds a predetermined pressure for effecting interruption of the excitation of the electric brake device.

51. In a vehicle brake system, an electric brake device, fluid pressure operated means operative in response to a predetermined pressure to effect excitation of the brake device, valve means operative to control the supply and release of fluid under pressure to and from the fluid pressure operated means, and a second fluid pressure operated means subject to the pressure of fluid supplied to said first fluid pressure operated means and operative in response to a second predetermined pressure higher than the first predetermined pressure for effecting interruption of the excitation of the said brake device.

52. In a vehicle brake system, brake means, control means operative to cause fluid under pressure to be supplied or released to effect application or release of the brake means, means operative to control the operation of said control means including means adapted to be conditioned responsively according to the load carried by the vehicle, and means effective when the pressure of the fluid supplied upon operation of the said control means to effect application of the brake means attains a predetermined value for rendering the load responsive means responsive to changes in the load carried by the vehicle.

53. In a vehicle brake system, electric brake means, fluid pressure operated rheostat means operative to vary the excitation of the electric brake means, control means operative to cause fluid under pressure to be supplied or released to effect operation of the rheostat means, means operative to control the operation of said control means including means adapted to be conditioned responsively according to the load carried by the vehicle, and means effective when the pressure of the fluid supplied upon operation of said control means attains a predetermined value for rendering the load responsive means responsive to changes in the load carried by the vehicle and for effecting interruption of the excitation of the said electric brake means.

54. In a vehicle brake system, in combination, brake means for producing a braking effect on a vehicle wheel, power-transmitting means through the medium of which the brake means produces braking effect on the wheel, said power-transmitting means having two parts adapted to move yieldingly relative to each other to a degree in accordance with the degree of braking effect produced on the wheel, a rheostat conditioned according to the degree of relative movement of the parts of the power-transmitting means, electro-responsive means energized to a degree according to the condition of the rheostat, and means actuated according to the degree of energization of the electro-responsive means and thus according to the degree of braking effect produced on the wheel, for controlling the said brake means.

55. In a vehicle brake system, in combination, brake means for producing a braking effect on a vehicle wheel, a power-transmitting device through the medium of which the brake means produces braking effect on the wheel, said device having two parts adapted to move yieldingly relative to each other to a degree in accordance with the degree of braking effect produced on the wheel, means manually operative to effect application of the brake means, a rheostat conditioned according to the degree of relative movement of the parts of the said device, electro-responsive means energized to a degree according to the condition of the rheostat and subject to the control of said manually operative means, and means actuated in accordance with the degree of energization of the electro-responsive means and thus according to the degree of braking effect produced on the vehicle wheel, for controlling said brake means.

56. In a brake system, in combination, a driven element, driving means, means for braking said driving means, power-transmitting means through the medium of which said driving means drives the driven element, said power-transmitting means including resilient yielding means whereby relative movement of the driven element and the driving means occurs upon application of the braking means to the driving means, the degree of relative movement of the driven element and the driving means being in accordance with the degree of braking effect produced on the driven element, rheostat means conditioned according to the degree of relative movement of the driving means and the driven element, electro-responsive means energized to a degree corresponding to the condition of the said rheostat means, and means actuated in accordance with the degree of the energization of the electro-responsive means and thus according to the braking effect produced on the driven element, for controlling the braking means.

57. In a vehicle brake system, in combination, a pair of axles, individual driving means for each of said axles, individual means for braking each of the said driving means, power-transmitting means through the medium of which each axle is driven by its corresponding driving means, each of the power-transmitting means having resilient yielding means whereby relative movement of the driving means and the axle driven thereby may occur, the degree of relative movement being in accordance with the degree of the braking effect produced on the axle, a rheostat device associated with each power-transmitting means and conditioned according to the degree of relative movement of the driving means and the corresponding axle, an electro-responsive device for each axle energized to a degree in accordance with the condition of the corresponding rheostat device, and means controlled jointly by said electro-responsive devices and actuated in accordance with the greater of the braking effects produced on the two said axles, for controlling the braking means for both axles.

58. In a vehicle brake system, in combination, a pair of axles, individual driving means for each of said axles, individual means for braking each of the said driving means, power-transmitting means through the medium of which each axle is driven by its corresponding driving means, each of the power-transmitting means having resilient yielding means whereby relative movement of the driving means and the axle driven thereby may occur, the degree of relative movement being in accordance with the degree of the braking effect produced on the axle, a rheostat device associated with each power-transmitting means and conditioned according to the degree of relative movement of the driving means and the corresponding axle, an electro-responsive device for each axle energized to a degree in accordance with the condition of the corresponding rheostat device, and means controlled jointly by said electro-responsive devices and actuated in accordance with the difference of the braking effects produced on the two said axles, for controlling the brake means for both axles.

JOHN W. LOGAN, Jr.